(12) United States Patent
Stockman

(10) Patent No.: US 10,056,195 B2
(45) Date of Patent: *Aug. 21, 2018

(54) ELECTROLYTIC CAPACITOR

(71) Applicant: American Radionic Company, Inc., Palm Coast, FL (US)

(72) Inventor: Robert M. Stockman, Palm Coast, FL (US)

(73) Assignee: American Radionic Company, Inc., Palm Coast, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,008

(22) Filed: Aug. 3, 2016

(65) Prior Publication Data

US 2017/0186554 A1    Jun. 29, 2017

Related U.S. Application Data

(63) Continuation of application No. 13/965,591, filed on Aug. 13, 2013, now Pat. No. 9,424,995, which is a continuation of application No. 13/116,461, filed on May 26, 2011, now Pat. No. 8,537,522, which is a continuation of application No. 11/966,358, filed on Dec. 28, 2007, now Pat. No. 7,952,854.

(60) Provisional application No. 60/882,813, filed on Dec. 29, 2006.

(51) Int. Cl.
| | | |
|---|---|---|
| *H01G 9/008* | (2006.01) |
| *H01G 9/12* | (2006.01) |
| *H01G 9/10* | (2006.01) |
| *H01G 9/145* | (2006.01) |
| *H01G 9/26* | (2006.01) |

(52) U.S. Cl.
CPC ............. *H01G 9/12* (2013.01); *H01G 9/008* (2013.01); *H01G 9/10* (2013.01); *H01G 9/145* (2013.01); *H01G 9/26* (2013.01)

(58) Field of Classification Search
CPC ............ H01G 9/12; H01G 9/008; H01G 9/15; H01G 9/10; H01G 4/008; H01G 4/32; H01G 4/38
See application file for complete search history.

(56) References Cited

U.S. PATENT DOCUMENTS

| | | |
|---|---|---|
| 1,665,499 A | 4/1928 | Hoch |
| 1,707,959 A | 4/1929 | Fried |
| 1,943,714 A | 1/1934 | Bailey |
| 2,202,166 A | 11/1937 | Peck |

(Continued)

FOREIGN PATENT DOCUMENTS

| | | |
|---|---|---|
| CA | 2285721 | 4/2000 |
| EP | 1115128 | 7/2001 |

(Continued)

OTHER PUBLICATIONS

Defendants' First Supplemental Disclosure of Non-Infringement and Invalidity Contentions *American Radionic, Inc.*, v. *Packard, Inc.*, and Cornell-Dubilier Electronics, Inc., No. 6:14-cv-01881-RBD-KRS.

(Continued)

*Primary Examiner* — Nguyen Ha
(74) *Attorney, Agent, or Firm* — Fish & Richardson P.C.

(57) ABSTRACT

An apparatus is disclosed which includes an electrolytic capacitive element with multiple capacitor sections.

19 Claims, 22 Drawing Sheets

(56) References Cited

U.S. PATENT DOCUMENTS

| | | |
|---|---|---|
| D122,825 S | 10/1940 | Peck |
| D124,726 S | 1/1941 | Shimer |
| 2,569,925 A | 12/1948 | Deeley |
| 2,896,008 A | 12/1953 | Putz |
| 3,015,687 A | 11/1959 | Ruscito |
| 3,302,081 A | 1/1967 | Grahame |
| 3,304,473 A | 2/1967 | Netherwood et al. |
| D210,210 S | 2/1968 | Braiman et al. |
| 3,377,510 A | 4/1968 | Rayno |
| 3,921,041 A | 11/1975 | Stockman |
| 3,988,650 A | 10/1976 | Fritze |
| 4,028,595 A | 6/1977 | Stockman |
| 4,095,902 A | 6/1978 | Florer et al. |
| 4,106,068 A | 8/1978 | Flanagan |
| 4,107,758 A | 8/1978 | Shirn et al. |
| 4,112,424 A | 9/1978 | Lapeyre |
| 4,209,815 A | 6/1980 | Rollins et al. |
| 4,240,126 A | 12/1980 | Sanvito |
| 4,263,638 A | 4/1981 | Stockman et al. |
| 4,312,027 A | 1/1982 | Stockman |
| 4,326,237 A | 4/1982 | Markarian et al. |
| 4,352,145 A | 9/1982 | Stockman |
| 4,363,078 A | 12/1982 | Dwyer |
| 4,398,782 A | 8/1983 | Markarian |
| 4,408,818 A | 10/1983 | Markarian |
| 4,420,791 A | 12/1983 | Shedigian |
| 4,447,854 A | 5/1984 | Markarian |
| 4,459,637 A | 7/1984 | Shedigian |
| 4,486,809 A | 12/1984 | Deak et al. |
| 4,558,394 A | 12/1985 | Stockman |
| 4,586,107 A | 4/1986 | Price |
| 4,609,967 A | 9/1986 | Shedigian |
| 4,621,301 A | 11/1986 | Shedigian |
| 4,631,631 A | 12/1986 | Hodges et al. |
| 4,633,365 A | 12/1986 | Stockman |
| 4,633,367 A | 12/1986 | Strange et al. |
| 4,633,369 A | 12/1986 | Lapp et al. |
| 4,639,828 A | 1/1987 | Strange et al. |
| 4,642,731 A | 2/1987 | Shedigian |
| 4,698,725 A | 10/1987 | MacDougall et al. |
| 4,754,361 A | 6/1988 | Venturini |
| 4,812,941 A | 3/1989 | Rice et al. |
| 4,897,760 A | 1/1990 | Bourbeau |
| 5,006,726 A | 4/1991 | Okumura |
| 5,019,934 A | 5/1991 | Bentley et al. |
| 5,138,519 A | 8/1992 | Stockman |
| 5,148,347 A | 9/1992 | Cox et al. |
| 5,313,360 A | 5/1994 | Stockman |
| 5,381,301 A | 1/1995 | Hudis |
| 5,673,168 A | 9/1997 | Efford et al. |
| 5,921,820 A | 7/1999 | Dijkstra |
| 5,940,263 A | 8/1999 | Jakoubovitch |
| 6,009,348 A | 12/1999 | Rorvick et al. |
| 6,014,308 A * | 1/2000 | Stockman ............... H01G 4/221 361/301.5 |
| 6,031,713 A | 2/2000 | Takeishi et al. |
| 6,084,764 A | 7/2000 | Anderson |
| 6,141,205 A | 10/2000 | Nutzman |
| 6,147,856 A | 11/2000 | Karidis |
| 6,157,531 A | 12/2000 | Breyen et al. |
| 6,212,058 B1 | 4/2001 | Huber |
| 6,222,270 B1 | 4/2001 | Lee |
| 6,282,078 B1 | 8/2001 | Tsai |
| 6,282,081 B1 | 8/2001 | Takabayashi et al. |
| 6,310,756 B1 | 10/2001 | Miura et al. |
| 6,313,978 B1 | 11/2001 | Stockman et al. |
| 6,373,720 B1 | 4/2002 | Fechtig et al. |
| 6,385,490 B1 | 5/2002 | O'Phelan |
| 6,404,618 B1 | 6/2002 | Beard et al. |
| 6,490,158 B1 | 12/2002 | Ellyson et al. |
| 6,697,249 B2 | 2/2004 | Maletin et al. |
| 6,798,677 B2 | 9/2004 | Jakob et al. |
| 6,807,048 B1 | 10/2004 | Nielsen |
| 6,819,545 B1 | 11/2004 | Lobo et al. |
| 6,842,328 B2 | 1/2005 | Schott |
| 6,847,517 B2 | 1/2005 | Iwaida et al. |
| 6,888,266 B2 | 5/2005 | Burke et al. |
| 6,922,330 B2 | 7/2005 | Nielson et al. |
| 6,930,874 B2 | 8/2005 | Lobo |
| 6,982,539 B1 | 1/2006 | Ward |
| 6,995,971 B2 | 2/2006 | Norton |
| 7,031,139 B1 | 4/2006 | Fayram |
| 7,046,498 B1 | 5/2006 | Huang |
| D522,456 S | 6/2006 | Matsumoto |
| 7,110,240 B2 | 9/2006 | Breyen |
| 7,203,053 B2 | 4/2007 | Stockman |
| 7,251,123 B2 | 7/2007 | O'Phelan |
| 7,365,959 B1 | 4/2008 | Ward |
| 7,423,861 B2 | 9/2008 | Stockman |
| 7,474,519 B2 | 1/2009 | Stockman |
| 7,474,520 B2 | 1/2009 | Kashihara |
| 7,492,574 B2 | 2/2009 | Fresard et al. |
| 7,511,941 B1 | 3/2009 | Gallay |
| 7,547,233 B2 | 6/2009 | Inoue et al. |
| 7,667,954 B2 | 2/2010 | Lessner |
| 7,710,713 B2 | 5/2010 | Restorff |
| D621,789 S | 8/2010 | Wang et al. |
| 7,835,133 B2 | 11/2010 | Stockman |
| 7,848,079 B1 * | 12/2010 | Gordin ................. H01G 2/04 361/328 |
| 7,867,290 B2 | 1/2011 | Nielsen |
| 7,881,043 B2 | 2/2011 | Hirose et al. |
| 7,911,762 B2 | 3/2011 | Stockman |
| 7,911,766 B2 | 3/2011 | Caumont et al. |
| 7,952,854 B2 | 5/2011 | Stockman |
| 7,987,593 B1 | 8/2011 | Gorst |
| 8,029,290 B2 | 10/2011 | Johnson |
| 8,170,662 B2 | 5/2012 | Bocek |
| 8,174,817 B2 * | 5/2012 | Georgopoulos ....... H01G 4/224 361/301.5 |
| 8,270,143 B2 | 9/2012 | Stockman |
| 8,274,778 B2 | 9/2012 | Yoshinaga et al. |
| 8,310,802 B2 | 11/2012 | Fujii et al. |
| 8,331,076 B2 * | 12/2012 | Tuncer ................. H01G 4/105 361/301.4 |
| 8,456,795 B2 | 6/2013 | Stockman |
| 8,465,555 B2 | 6/2013 | Sherwood |
| 8,514,547 B2 | 8/2013 | Galvagni |
| 8,514,548 B2 | 8/2013 | Miller et al. |
| 8,531,815 B2 * | 9/2013 | Stockman ................ H01G 2/24 361/301.5 |
| 8,537,522 B2 | 9/2013 | Stockman |
| 8,559,161 B2 | 10/2013 | Takeoka et al. |
| 8,761,875 B2 | 6/2014 | Sherwood |
| 8,842,411 B2 | 9/2014 | Zhang |
| 8,853,318 B2 | 10/2014 | Tielemans |
| 8,861,178 B2 | 10/2014 | Terashima et al. |
| 8,861,184 B2 | 10/2014 | Schmidt |
| 8,871,850 B2 | 10/2014 | Koh et al. |
| 8,885,318 B2 | 11/2014 | Stockman |
| 8,891,224 B2 * | 11/2014 | Stockman ................ H01G 2/24 361/301.5 |
| D729,164 S | 5/2015 | Chen |
| 9,105,401 B2 | 8/2015 | Dreissig |
| 9,318,261 B2 | 4/2016 | Stockman |
| 9,324,501 B2 * | 4/2016 | Stockman ................ H01G 5/38 |
| 9,343,238 B2 | 5/2016 | Stockman |
| 9,378,893 B2 | 6/2016 | Stockman |
| 9,412,521 B2 | 8/2016 | Stockman |
| 9,424,995 B2 * | 8/2016 | Stockman ............... H01G 9/008 |
| 9,466,429 B1 * | 10/2016 | Casanova ............. H01G 11/82 |
| D771,567 S | 11/2016 | Flohe et al. |
| 9,496,086 B2 * | 11/2016 | Stockman ............. H01G 2/106 |
| 9,536,670 B2 | 1/2017 | Stockman |
| 9,859,060 B1 | 1/2018 | Stockman et al. |
| 9,916,934 B1 | 3/2018 | Casanova et al. |
| 2001/0025618 A1 | 10/2001 | Kelling |
| 2006/0201971 A1 | 9/2006 | Wegman |
| 2006/0227495 A1 * | 10/2006 | Stockman ................ H01G 2/24 361/328 |
| 2007/0025051 A1 | 2/2007 | Stockman |
| 2007/0236860 A1 | 10/2007 | Stockman |
| 2007/0279015 A1 | 12/2007 | Livingston et al. |

(56) References Cited

U.S. PATENT DOCUMENTS

| | | | | |
|---|---|---|---|---|
| 2008/0158780 | A1* | 7/2008 | Stockman | H01G 9/008 361/520 |
| 2009/0052109 | A1 | 2/2009 | Stockman et al. | |
| 2009/0219665 | A1 | 9/2009 | Stockman | |
| 2011/0063775 | A1 | 3/2011 | Stockman | |
| 2011/0134584 | A1 | 6/2011 | Stockman | |
| 2011/0157764 | A1 | 6/2011 | Stockman | |
| 2011/0228446 | A1 | 9/2011 | Stockman | |
| 2011/0317333 | A1 | 12/2011 | Chun | |
| 2013/0003252 | A1 | 1/2013 | Stockman | |
| 2013/0214720 | A1 | 8/2013 | Stockman | |
| 2013/0329342 | A1 | 12/2013 | Stockman | |
| 2013/0343029 | A1 | 12/2013 | Stockman | |
| 2014/0049205 | A1 | 2/2014 | Curiel | |
| 2014/0201018 | A1 | 7/2014 | Chassin | |
| 2014/0285949 | A1 | 9/2014 | Stockman | |
| 2014/0347784 | A1 | 11/2014 | Stockman et al. | |
| 2015/0016012 | A1 | 1/2015 | Stockman | |
| 2015/0022991 | A1 | 1/2015 | Stockman et al. | |
| 2015/0138690 | A1 | 5/2015 | Stockman | |
| 2015/0255218 | A1 | 9/2015 | Stockman et al. | |
| 2016/0203916 | A1 | 7/2016 | Stockman | |
| 2016/0233030 | A1* | 8/2016 | Stockman | H01G 2/24 |
| 2017/0011855 | A1 | 1/2017 | Stockman et al. | |
| 2017/0032898 | A1 | 2/2017 | Stockman | |
| 2017/0110252 | A1 | 4/2017 | Stockman | |
| 2017/0236646 | A1 | 8/2017 | Stockman | |
| 2018/0090278 | A1 | 3/2018 | Stockman et al. | |

FOREIGN PATENT DOCUMENTS

| | | |
|---|---|---|
| EP | 2587503 | 5/2013 |
| FR | 2343221 | 9/1977 |
| GB | 517718 | 2/1940 |
| GB | 2070861 | 9/1981 |
| GB | 2169747 | 7/1986 |

OTHER PUBLICATIONS

Photograph 1 from Defendants' First Supplemental Disclosure of Non-Infringement and Invalidity Contentions, undated (1 page).
Photograph 2 from Defendants' First Supplemental Disclosure of Non-Infringement and Invalidity Contentions, undated (1 page).
Photograph 3 from Defendants' First Supplemental Disclosure of Non-Infringement and Invalidity Contentions, undated (1 page).
Photograph 4 from Defendants' First Supplemental Disclosure of Non-Infringement and Invalidity Contentions, undated (1 page).
Photograph 5 from Defendants' First Supplemental Disclosure of Non-Infringement and Invalidity Contentions, undated (1 page).
Photograph 6 from Defendants' First Supplemental Disclosure of Non-Infringement and Invalidity Contentions, undated (1 page).
Photograph 7 from Defendants' First Supplemental Disclosure of Non-Infringement and Invalidity Contentions, undated (1 page).
Photograph 8, undated (1 page).
Photograph 9, undated (1 page).
Photograph 10, undated (1 page).
Photograph 11, undated (1 page).
Photograph 12, undated (1 page).
Photograph 13, undated (1 page).
Photograph 14, undated (1 page).
Photograph 15, undated (1 page).
Photograph 16, undated (1 page).
Photograph 17, undated (1 page).
Photograph 18, undated (1 page).
Photograph 19, undated (1 page).
Photograph 20, undated (1 page).
Document from Defendants' First Supplemental Disclosure of Non-Infringement and Invalidity Contentions that purported to be Standard for Safety UL 810 Capacitors, Underwriters Laboratories Inc. having multiple dates ranging from 1976 to 1988 (22 pages).

"Industrial Power Factor Correction Capacitors," Cornell Dubilier, Undated (1 page).
"American Radionic Co., Inc. Introduces a New Circuit Component The Patented Ultramet™ Capacitor," poster by American Radionic Co., Inc., (poster undated, 1980 year date appears below one image), (one page).
"AC Capacitors," brochure by AmRad Engineering, Inc., undated (4 page).
"American Radionic Co., Inc. Introduces A New Circuit Component, The Patented Ultramet™ Capacitor," poster by American Radionic Co., Inc., which is reprint from Electronic News dated Feb. 11, 1980, (one page).
"American Radionic Co., Inc. Introduces . . . The World's First Multiple Metallized Film Dielectric Capacitor Produced from a Single Winding! The Patented Ultramet™ Capacitor," poster by American Radionic Co., Inc. (undated) (one page).
"American Radionic Company's Chronology of Patents, New Products and Technology Transfer Programs—From the Present, to the Past, a Thirty-Five Year Review," online website having URL: http:/www.americanradionic.com/content/blogcategory/13/29/8/16 , accessed May 19, 2014 (undated)(3 pages).
"American Radionic Introduces Capacitors Without Compromise", color brochure, 1989, (1 page).
"American Radionics—Home of the Turbo200 MultiUse Capacitor," online archive of website captured at http://web.archive.org/web/20050309191805fw_/http://www.americanradionic.com/home , Mar. 9, 2005, (16 pages) (accessed May 29, 2014).
"AmRad Engineering: Universal Capacitor," The Air Conditioning|Heating|Refrigeration News, Jan. 29, 2005, Printout of website having URL: http://www.archrnews.com/articles/print/amrad-engineering-universal-capacitor (accessed Jun. 2, 2014)(1 page).
"Capacitors—Motor Run, Oil Filled Capacitors, AC Rated. AmRad." Online archive of website captured at http:/webarchive.org/web/20011126195819/http://www.americanradionic.com, Nov. 26, 2001, (13 pages)(accessed May 29, 2014).
"Capacitors—Motor Run, Oil Filled Capacitors, AC Rated. AmRad." Printout of website having URL: http://amradcapacitors.com/index.htm, Jan. 3, 2003(20 pages).
"Capacitors—Motor Run, Oil Filled Capacitors, AC Rated. AmRad." Online archive of website captured at http://webarchive.org/web/20041214091042/http://americanradionic.com, Dec. 14, 2004, (13 pages)(accessed May 29, 2014).
Hudis, Martin et al., "Motor-Run Capacitors," Motors & Motor Control, undated (reprinted from Appliance Manufacturer, Oct. 1994) (3 pages).
Hudis, Martin, "Plastic Case Self-Protected Liquid Filled AC Capacitors for 70° Applications," Presented at CAPTECH '97, Mar. 1997, 7 pages.
Hudis, Martin, "Technology Evolution in Metallized Polymeric Film Capacitors over the Past 10 Years," Presented at CARTS Symposium in Nice, France, Oct. 1996, 9 pages.
International Search Report and Written Opinion, PCT/US2014/39003, dated Oct. 2, 2014, 12 pages.
Macomber, Laird L., et al., "New Solid Polymer Aluminum Capacitors Improve Reliability," Electro Power Electronics, Oct. 1, 2001, 5 pages.
Macomber, Laird L., et al., "Solid Polymer Aluminum Capacitor Chips in DC-DC Converter Modules Reduce Cost and Size and Improve High-Frequency Performance," PCIM Power Electronics 2001 Proceeding for the PowerSystems World Conference, Sep. 2001, 8 pages.
Mallory Distributor Products Co., 1967 Precision Electronic Components Catalog, 52 pages.
Parente, Audrey, "Can-sized device the right fit," The Daytona Beach News-Journal, Jan. 3, 2005 (2 pages).
"Product of the Year Awards," Electronic Products Magazine, Jan. 1981, pp. 39-45.
"Super-Sized Show," ASHRae Journal Show Daily, 2005 International Air-Conditioning, Heating, Refrigerating Exposition, Tuesday, Feb. 8, 2005 (24 pages).

(56) References Cited

OTHER PUBLICATIONS

"The Patented Ultramet™ Capacitor. A product of years of American Radionic research & development," poster by American Radionic Co., Inc. (undated) (one page).
"The Patented Ultramet™ Capacitor," poster by American Radionic Co., Inc., (undated) (three pages).
Complaint for Patent Infringement against Cornell-Dubliner Electronics, Inc., Packard Inc. with Jury Demand (Filing fee $400 receipt No. ORL-38930) filed by American Radionic Company, Inc. (Attachments: #1 Civil Cover sheet, #2 Exhibit A)(LMM) Modified on Nov. 19, 2014 (LMM). (Entered: Nov. 19, 2014).
Answer and affirmative defenses to Complaint by Cornell-Dubliner Electronics, Inc. (Allaman, Melissa) (Entered: Jan. 9, 2015).
Answer and affirmative defenses to Complaint by Packard Inc. (Allaman, Melissa) (Entered: Jan. 9, 2015).
First Amended Answer and affirmative defenses to 1 Complaint by Packard Inc. (Allaman, Melissa) (Entered: Jan. 9, 2015).
First Amended Answer and affirmative defenses to 1 Complaint by Cornell-Dubliner Electronics, Inc. (Allaman, Melissa) (Entered: Feb. 4, 2015).
Case Management and Scheduling Order: Amended Pleadings and Joinder of Parties due by Apr. 9, 2015. Discovery due by Feb. 16, 2016. Dispositive motions due by Apr. 7, 2016. Pretrial statement due by Aug. 11, 2016. All other motions due by Jul. 28, 2016. Plaintiff disclosure of expert report due by Dec. 10, 2015. Defendant disclosure of expert report due by Jan. 14, 2016. Final Pretrial Conference set for Aug. 18, 2016 at 01:15 PM in Orlando Courtroom 4 A before Judge Roy B. Dalton, Jr., Jury Trial Set for the trial team commencing Sep. 6, 2016 at 09:00 AM in Orlando Courtroom 4 A before Judge Roy B. Dalton Jr., Conduct mediation hearing by Mar. 29, 2016. Lead counsel to coordinate dates. Signed by Judge Roy B. Dalton, Jr. on Feb. 10, 2015. (VMF). (Entered: Feb. 10, 2015).
Status report Joint Claim Construction Statement by American Radionic Company, Inc., Packard Inc., and Cornell-Dubliner Electronics, Inc. (Attachments: #1 Exhibit 1, #2 Exhibit 2) (Graubart, Noah) Modified on May 29, 2015 (SWT). (Entered: May 28, 2015).
Declaration of Noah C. Graubart in Support of Plaintiff's Claim Construction Brief by American Radionic Company, Inc. (Attachments: #1 Exhibit 1, #2 Exhibit 2, #3 Exhibit 3, #4 Exhibit 4, #5 Exhibit 5, #6 Exhibit 6) (Graubart, Noah) (Entered: Jun. 18, 2015).
Plaintiff's Brief re 59 Declaration Plaintiff's Claim Construction Brief filed by American Radionic Company, Inc. (Graubart, Noah) (Entered May 18, 2015).
Response to Plaintiff's Claim Construction Brief re 60 Brief—Plaintiff filed by Cornell-Dubliner Electronics, Inc., Packard Inc. (Killen, Craig) Modified on Jul. 17, 2015 (EJS). (Entered Jul. 16, 2015.
Joint Pre-Hearing Statement re: Claim Construction by American Radionic Company, Inc., Packard Inc., Cornell-Dubliner Electronics, Inc. (Attachments: #1 Exhibit 1, #2 Exhibit 2) (Graubart, Noah) Modified on Jul. 24, 2015.
Minute Entry, Proceedings of Claim Construction Hearing held before Judge Roy B. Dalton, Jr. on Aug. 24, 2015. Court Report: Arnie First (VMF) (FMV). (Entered: Aug. 24, 2015).
Notice of Filing of Claim Construction Evidence by American Radionic Company, Inc. (Attachments: #1 Exhibit 1, #2 Exhibit 2, #3 Exhibit 3) (Graubart, Noah) Modified on Aug. 25, 2015 (EJS). (Entered: Aug. 25, 2015).
Transcript of Markman Hearing held on Aug. 24, 2015 before Judge Roy B. Dalton, Jr., Court Reporter Arnie R. First, DRD, CRR< ArnieFirst.CourtReporter@gmail.com. Transcript may be viewed at the court public terminal or purchased through the Court Reporter before the deadline for Release of Transcript Restriction. After that date it may be obtained through PACER or purchased through the court Reporter, Redaction Request due Oct. 22, 2015. Redacted Transcript Deadline set for Nov. 2, 2015. Release of Transcript Restriction set for Dec. 30, 2015. (ARF) (Entered: Oct. 1, 2015).
Order granting 69 Motion for Consent Judgment and Injunction, Signed by Judge Roy B. Dalton, Jr. on Nov. 5, 2015. (CAC) (Entered Nov. 5, 2015).
Grainger, "Round Motor Dual Run Capacitor, 40/5 Microfarad Rating, 370VAC Voltage," Retrieved from the Internet: URL<https://www.grainger.com/product/5CMW3&AL!2966!3!166587674359!!!g!82128730437!?cm_mmc=PPC:+Google+PLA?campaignid=719691765&s_kwcid=AL!2966!3!166587674359!!!!82128730437!&ef_id=WRSnxQAAAILWhR1b:20170824174108:s>. Visited Aug. 24, 2017, Capacitor.
Amazon. <URL: https://www.amazon.com/Amrad-Turbo-Universal-Motor-Capacitor/dp/B00B610TOM/ref=pd_rhf_dp_s_cp_0_7?_encoding=UTF8&pd_rd_i=B00B610TOM&pd_rd_r=N5WYCAD5Y36C86DFWDEG&pd_rd_w=6tW71&pd_rd_wg=DWEJcApsc=1&refRID=N5WYCAD5Y36C86DFWDEG.> Jan. 27, 2013. Amrad Turbo 200X Universal Motor Run Capacitor.
YouTube. <URL: https://www.youtube.com/watch?v=R5B189BWrz0.> Jul. 29, 2011. HVAC Service : Install New Turbo 200 Capacitor.
YouTube. <URL: https://www.youtube.com/watch?v=U7h7pg12t6M.> Jul. 15, 2011. How to Install the Turbo 200 Capacitor.
Amazon. <URL: https://www.amazon.com/CPT00656-Trane-Round-Capacitor-Upgrade/dp/BOOEVTIOMC/ref=cm_cr_arp_d_product_top?ie=UTF8.> May 11, 2016. Replacement Trane Round Dual Run Capacitor, 6 pages.
Amazon. <URL: https://www.amazon.com/MARS-Motors-Armatures-12788-Capacitor/dp/BOOCOYS2CM/ref=pd_sim_328_6?_encoding=UTF8&pd_rd_i=BOOCOYS2CM&pd_rd_r=KEFT1DXGOAWQ1KCZDJFJ&pd_rd_w=LNF6S&pd_rd_wg=5eFTh&psc=1&refRID=KEFT1DXGOAWQ1KCZDJFJ.> Jan. 25, 2012. MARS Dual Run Capacitor, 7 pages.
Amazon. <URL: https://www.amazon.com/AmRad-Turbo-200-Mini-Oval/dp/BOOKQSKDOY/ref=pd_sbs_60_4?_encoding=UTF8&pd_rd_i=BOOKQSKDOY&pd_rd_r=A6')/0E2')/080')/0A6.> May 5, 2015. AmRad Turbo 200 Mini Oval Capacitor with label and color trim, 5 pages.
Amazon. <URL: https://www.amazon.com/AmRad-U5A2227-MFD-370-Volt/dp/BOOGSU3YV8/ref=pd_day0_328_6?encoding=UTF8&pd_rd_i=BOOGSU3YV8&pd_rd_r%E2')/080')/0A6.> Jun. 29, 2014. AmRad Dual Run Capacitor, 6 pages.
Amazon. <URL: https://www.amazon.com/gp/product/B01HPK5ANO/ref=s9_dcacsd_dcoop_bw_c_x_6_w.> Aug. 21, 2016. Titan TRCFD405 Dual Rated Motor Run Capacitor, 6 pages.
Amazon. <URL: https://www.amazon.com/Labels-Protective-Backed-Clean-Remove-Adhesive/dp/BOOVIDW1C1/ref=sr_1_18?ie=UTF8&clid=1522957818&sr=8-18&keycY0E2')/080')/0A6.> Apr. 1, 2015. Labels, 7 pages.
Amazon. <URL: https://www.amazon.com/Packard-TRCFD405-5MFD-370VACCapacitor/dp/B009558E9U/ref=pd_sim_328_4?_encoding=UTF8&pd_rd_i=B009558E9U&pd_rd_r=SX1DRWZQZ8SH12JWHYH2&pd_rd_w=y1jQe&pd_rd_wg=mH0nl&psc=1&refRID=SX1DRWZQZ8SH12JWHYH2&dp1D=31IxzeyCr/0252B7L&preST=_QL70_&dpSrc=detail.> May 1, 2015. Packard Capacitor, 5 pages.
Amazon. <URL: https://www.amazon.com/Universal-Capacitor-Trane-Replacement-USA2031/dp/BOOGSU4OKW/ref=pd_sim_328_3?_encoding=UTF8&pd_rd_i=BOOGSU4OKW&pd_rd_r=YX6P84XR7NY113X4DWJG&pd_rd_w=gejaD&pd_rd_wg=NLVIY&psc=1&refRID=YX6P84XR7NY113X4DWJG.> Nov. 26, 2014. Am Rad Oval Universal Capacitor with label and color trim, 6 pages.
Amazon. <URL:https://www.amazon.com/dp/B01F7P8GJO/ref=sspa_dk_detail_4?psc=1.> Aug. 1, 2016. TradePro PowerWell Dual Run Round Capacitor, 6 pages.
YouTube. <URL: https://www.youtube.com/watch?v=19A9IvQ611A&t=3s.> Oct. 1, 2015. GE Dual Run Capacitor, 5 pages.

(56) References Cited

OTHER PUBLICATIONS

YouTube. <URL: https://www.youtube.com/watch?v=Xiw_xHXJHUg.> Sep. 4, 2011. AmRad Dual Run Capacitor, 4 pages.

* cited by examiner

FIG. 19

— This is the capacitor value being replaced.

| Mfd=microfarad |
|---|

Using this chart, add across to calculate the microfarad values needed to obtain the required final total which will be equal to the part being replaced.

Attach the enclosed jumper wires to the various terminals to obtain the desired microfarad value. Then, connect one lead from the compressor to the common (Black Cup - Center Terminal) and the other lead to the terminal of highest microfarad value that has been selected.

Single Value Capacitors

| Item No. | Green | White | White | Red | Yellow | Blue | | Portal Value |
|---|---|---|---|---|---|---|---|---|
| | 2.5 mfd | 5.0 mfd | 5.0 mfd | 10.0 mfd | 20.0 mfd | 25.0 mfd | | mfd |
| 1 | 2.5 | | | | | | Equals | 2.5 |
| 2 | | 5.0 | | | | | Equals | 5.0 |
| 3 | 2.5 | 5.0 | | | | | Equals | 7.5 |
| 4 | | | | 10.0 | | | Equals | 10.0 |
| 5 | 2.5 | | | 10.0 | | | Equals | 12.5 |
| 6 | | 5.0 | | 10.0 | | | Equals | 15.0 |
| 7 | 2.5 | 5.0 | | 10.0 | | | Equals | 17.5 |
| 8 | | | | | 20.0 | | Equals | 20.0 |
| 9 | 2.5 | | | | 20.0 | | Equals | 22.5 |
| 10 | | 5.0 | | | 20.0 | | Equals | 25.0 |
| 11 | 2.5 | 5.0 | | | 20.0 | | Equals | 27.5 |
| 12 | | | | 10.0 | 20.0 | | Equals | 30.0 |
| 13 | 2.5 | | | 10.0 | 20.0 | | Equals | 32.5 |
| 14 | | 5.0 | | 10.0 | 20.0 | | Equals | 35.0 |
| 15 | 2.5 | 5.0 | | 10.0 | 20.0 | | Equals | 37.5 |
| 16 | | 5.0 | | 10.0 | | 25.0 | Equals | 40.0 |
| 17 | 2.5 | 5.0 | | 10.0 | | 25.0 | Equals | 42.5 |
| 18 | | | | | 20.0 | 25.0 | Equals | 45.0 |
| 19 | 2.5 | | | | 20.0 | 25.0 | Equals | 47.5 |
| 20 | | 5.0 | | | 20.0 | 25.0 | Equals | 50.0 |
| 21 | 2.5 | 5.0 | | | 20.0 | 25.0 | Equals | 52.5 |
| 22 | | | | 10.0 | 20.0 | 25.0 | Equals | 55.0 |
| 23 | 2.5 | | | 10.0 | 20.0 | 25.0 | Equals | 57.5 |
| 24 | | 5.0 | | 10.0 | 20.0 | 25.0 | Equals | 60.0 |
| 25 | 2.5 | 5.0 | | 10.0 | 20.0 | 25.0 | Equals | 62.5 |
| 26 | | 5.0 | 5.0 | 10.0 | 20.0 | 25.0 | Equals | 65.0 |
| 27 | 2.5 | 5.0 | 5.0 | 10.0 | 20.0 | 25.0 | Equals | 67.5 |

These are all parallel connections.

Dual Value Capacitors

This is the capacitor value being replaced. →

→ This is the capacitor value being replaced.

| | Fan Total | Horn (Compressor) | | | | Compressor Total |
|---|---|---|---|---|---|---|
| | Green | White | White | Red | Yellow | Blue | |
| Item No. | 2.5 mfd | 5.0 mfd | 5.0 mfd | 10.0 mfd | 20.0 mfd | 25.0 mfd | mfd |
| 1 | 2.5 | 5.0 | | | | | Equals 5.0 |
| 2 | 2.5 | | | 10.0 | | | Equals 10.0 |
| 3 | 2.5 | 5.0 | | 10.0 | | | Equals 15.0 |
| 4 | 2.5 | | | | 20.0 | | Equals 20.0 |
| 5 | 2.5 | 5.0 | | | 20.0 | | Equals 25.0 |
| 6 | 2.5 | 5.0 | | | | 25.0 | Equals 30.0 |
| 7 | 2.5 | | | 10.0 | | 25.0 | Equals 35.0 |
| 8 | 2.5 | 5.0 | | 10.0 | | 25.0 | Equals 40.0 |
| 9 | 2.5 | | | | 20.0 | 25.0 | Equals 45.0 |
| 10 | 2.5 | 5.0 | | | 20.0 | 25.0 | Equals 50.0 |
| 11 | 2.5 | | | 10.0 | 20.0 | 25.0 | Equals 55.0 |
| 12 | 2.5 | 5.0 | | 10.0 | 20.0 | 25.0 | Equals 60.0 |
| 13 | 2.5 | 5.0 | 5.0 | 10.0 | 20.0 | 25.0 | Equals 65.0 |

← This 2.5mfd capacitor can also be used as a direct substitute a 3.0mfd "fan" capacitor.

These are all parallel connections.

Mfd=microfarad

Using this chart, add across to calculate the microfarad values needed to obtain the required final total which will be equal to the part being replaced.

Use the enclosed jumper wires to actually obtain the desired microfarad value.

FIG. 20

Dual Value Capacitors

This is the capacitor value being replaced. → This is the capacitor value being replaced.

Mfd=microfarad

Using this chart, add across to calculate the microfarad values needed to obtain the required final total which will be equal to the part being replaced.

Use the enclosed jumper wires to actually obtain the desired microfarad value.

| Item No. | Fan Total White | Horn (Compressor) | | | | | Compressor Total |
|---|---|---|---|---|---|---|---|
| | | Green | White | Red | Yellow | Blue | |
| | | 2.5 | 5.0 | 10.0 | 20.0 | 25.0 | |
| | mfd | mfd | mfd | mfd | mfd | mfd | mfd |
| 1 | 5.0 | 2.5 | | | | | Equals | 2.5 |
| 2 | 5.0 | | 5.0 | | | | Equals | 5.0 |
| 3 | 5.0 | 2.5 | 5.0 | | | | Equals | 7.5 |
| 4 | 5.0 | | | 10.0 | | | Equals | 10.0 |
| 5 | 5.0 | 2.5 | | 10.0 | | | Equals | 12.5 |
| 6 | 5.0 | | 5.0 | 10.0 | | | Equals | 15.0 |
| 7 | 5.0 | 2.5 | 5.0 | 10.0 | | | Equals | 17.5 |
| 8 | 5.0 | | | | 20.0 | | Equals | 20.0 |
| 9 | 5.0 | 2.5 | | | 20.0 | | Equals | 22.5 |
| 10 | 5.0 | | 5.0 | | 20.0 | | Equals | 25.0 |
| 11 | 5.0 | 2.5 | 5.0 | | 20.0 | | Equals | 27.5 |
| 12 | 5.0 | | | 10.0 | 20.0 | | Equals | 30.0 |
| 13 | 5.0 | 2.5 | | 10.0 | 20.0 | | Equals | 32.5 |
| 14 | 5.0 | | 5.0 | 10.0 | 20.0 | | Equals | 35.0 |
| 15 | 5.0 | 2.5 | 5.0 | 10.0 | 20.0 | | Equals | 37.5 |
| 16 | 5.0 | | | | | 25.0 | Equals | 40.0 |
| 17 | 5.0 | 2.5 | | | | 25.0 | Equals | 42.5 |
| 18 | 5.0 | | 5.0 | | | 25.0 | Equals | 45.0 |
| 19 | 5.0 | 2.5 | 5.0 | | | 25.0 | Equals | 47.5 |
| 20 | 5.0 | | | 10.0 | | 25.0 | Equals | 50.0 |
| 21 | 5.0 | 2.5 | | 10.0 | | 25.0 | Equals | 52.5 |
| 22 | 5.0 | | 5.0 | 10.0 | | 25.0 | Equals | 55.0 |
| 23 | 5.0 | 2.5 | 5.0 | 10.0 | | 25.0 | Equals | 57.5 |
| 24 | 5.0 | | | 10.0 | 20.0 | 25.0 | Equals | 60.0 |
| 25 | 5.0 | 2.5 | | 10.0 | 20.0 | 25.0 | Equals | 62.5 |

This 5.0mfd capacitor (white cup) that is closest to the green cup can be used to Replace a 4.0mfd fan meter capacitor.

These are all parallel connections.

FIG. 21

This is the capacitor value being replaced.

Mfd=microfarad

Using this chart, add across to calculate the microfarad values needed to obtain the required final total which will be equal to the part being replaced.

Use the enclosed jumper wires to actually obtain the desired microfarad value.

This is the capacitor value being replaced.

Dual Value Capacitors

| Item No. | White | Green | Fan Total | | Horn (Compressor) | | | | Compressor Total |
|---|---|---|---|---|---|---|---|---|---|
| | 5.0 | 2.5 | | | 5.0 | 10.0 | 20.0 | 25.0 | |
| | mfd | mfd | | | mfd | mfd | mfd | mfd | mfd |
| 1 | 5.0 | 2.5 | 7.5 | | | 10.0 | | | equal | 10.0 |
| 2 | 5.0 | 2.5 | 7.5 | | 5.0 | 10.0 | | | equal | 15.0 |
| 3 | 5.0 | 2.5 | 7.5 | | | | 20.0 | | equal | 20.0 |
| 4 | 5.0 | 2.5 | 7.5 | | | | | 25.0 | equal | 25.0 |
| 5 | 5.0 | 2.5 | 7.5 | | 5.0 | | | 25.0 | equal | 30.0 |
| 6 | 5.0 | 2.5 | 7.5 | | | 10.0 | | 25.0 | equal | 35.0 |
| 7 | 5.0 | 2.5 | 7.5 | | 5.0 | 10.0 | | 25.0 | equal | 40.0 |
| 8 | 5.0 | 2.5 | 7.5 | | | | 20.0 | 25.0 | equal | 45.0 |
| 9 | 5.0 | 2.5 | 7.5 | | 5.0 | | 20.0 | 25.0 | equal | 50.0 |
| 10 | 5.0 | 2.5 | 7.5 | | | 10.0 | 20.0 | 25.0 | equal | 55.0 |
| 11 | 5.0 | 2.5 | 7.5 | | 5.0 | 10.0 | 20.0 | 25.0 | equal | 60.0 |

These are all parallel connections.

FIG. 22

Dual Value Capacitors

This is the capacitor value being replaced. → Horn (Compressor) ← This is the capacitor value being replaced.

| Item No. | Fan Total Red | Green | White | Yellow | Blue | | Compressor Total |
|---|---|---|---|---|---|---|---|
| | mfd | 2.5 mfd | 5.0 mfd | 20.0 mfd | 25.0 mfd | | mfd |
| 1 | 10.0 | | 5.0 | | | Equals | 10.0 |
| 2 | 10.0 | 2.5 | 5.0 | | | Equals | 12.5 |
| 3 | 10.0 | | | 20.0 | | Equals | 20.0 |
| 4 | 10.0 | 2.5 | | 20.0 | | Equals | 22.5 |
| 5 | 10.0 | | | | 25.0 | Equals | 25.0 |
| 6 | 10.0 | 2.5 | | | 25.0 | Equals | 27.5 |
| 7 | 10.0 | | 5.0 | | 25.0 | Equals | 30.0 |
| 8 | 10.0 | 2.5 | 5.0 | | 25.0 | Equals | 32.5 |
| 9 | 10.0 | | 5.0 | | 25.0 | Equals | 35.0 |
| 10 | 10.0 | 2.5 | 5.0 | | 25.0 | Equals | 37.5 |
| 11 | 10.0 | | | 20.0 | 25.0 | Equals | 45.0 |
| 12 | 10.0 | 2.5 | | 20.0 | 25.0 | Equals | 47.5 |
| 13 | 10.0 | | 5.0 | 20.0 | 25.0 | Equals | 50.0 |
| 14 | 10.0 | 2.5 | 5.0 | 20.0 | 25.0 | Equals | 52.5 |
| 15 | 10.0 | | 5.0 | 20.0 | 25.0 | Equals | 55.0 |
| 16 | 10.0 | 2.5 | 5.0 | 20.0 | 25.0 | Equals | 57.5 |

Mfd=microfarad

Using this chart, add across to calculate the microfarad values needed to obtain the required final total which will be equal to the part being replaced.

Use the enclosed jumper wires to actually obtain the desired microfarad value.

These are all parallel connections.

FIG. 23

| Ref: mfd rating | A 21-25 | B 30-36 | C 34-53 | D 72-86 | E 86-106 | F 106-130 | G 124-143 | H 135-155 | I 145-174 | J 161-193 | K 176-216 | L 189-227 | M 233-286 | N 270-324 |
|---|---|---|---|---|---|---|---|---|---|---|---|---|---|---|
| | 22.5 mfd | 33 mfd | 22.5+ 33.0 | 40+ 45.0 | 40+ 45+ 22.5 | 70+ 45+ | 70+ 45+ 22.5 | 70+ 40+ 45.0 | 70+ 45+ 22.5+ 33.0 | 70+ 90+ 22.5 | 70+ 90+ 40 | 70+ 90+ 40+ 22.5 | 70+ 90+ 45+ 40+ 22.5 | 22.5+ 33+ 40+ 45+ 70+ 90.0 |
| | | | 52.5 mfd | 85 mfd | 107.5 mfd | 115 mfd | 137.5 mfd | 155 mfd | 170 mfd | 182.5 mfd | 200 mfd | 222 mfd | 267.5 mfd | 300 mfd |

Capacitor section values
22.5
33.0
40.0
45.0
70.0
90.0
300 mfd total

FIG. 24

ELECTROLYTIC CAPACITOR

RELATED APPLICATION

This application is a continuation application and claims priority under 35 USC § 120 to U.S. patent application Ser. No. 13/965,591, filed on Aug. 13, 2013, which is a continuation of and claims priority to U.S. patent application Ser. No. 13/116,461, filed on May 26, 2011, now U.S. Pat. No. 8,537,522, issued on Sep. 17, 2013, which is a continuation of and claims priority to U.S. patent application Ser. No. 11/966,358, filed on Dec. 28, 2007, now U.S. Pat. No. 7,952,854, issued on May 31, 2011, which claims priority to U.S. Provisional Patent Application Ser. No. 60/882,813, filed on Dec. 29, 2006, the entire contents of each of which are hereby incorporated by reference.

BACKGROUND

This disclosure relates to a capacitor. More specifically it relates to a capacitor with multiple capacitor sections selectively connectable to match the capacitance or capacitances of one or more capacitors being replaced.

One common use for capacitors is in connection with the motors of air-conditioning systems. The systems often employ two capacitors, one used in association with a compressor motor and another smaller value capacitor for use in association with a fan motor. Air-conditioning systems of different BTU capacity, made by different manufacturers or being a different model may use capacitors having different values. These capacitors have a finite life and may fail, causing the system to become inoperative.

A serviceman making a service call usually does not know in advance whether a replacement capacitor is necessary to repair an air-conditioning system, or what value capacitor or capacitors might be needed for the repair. Often, the serviceman carries a large number of capacitors of different values in the service truck, but it is difficult and expensive to maintain such an inventory, especially because there can be a random need for several capacitors of the same value on the same day. Sometimes, the serviceman returns to the shop or visit a supplier to pick up a replacement capacitor of the required value. This is inefficient as the travel time to pick up parts greatly extends the overall time necessary to complete a repair, and detrimental if there is a backlog of inoperative air-conditioning systems on a hot day. A similar situation may occur is other applications such as refrigeration and heating systems, pumps, and manufacturing systems that utilize compressors.

SUMMARY

By providing a single capacitor adapted to replace any one of a large number of capacitors, a serviceman may carry the capacitor on a service call and, upon encountering one or more failed capacitors, the serviceman can utilize the capacitor to replace the failed capacitor or capacitors.

In general, the replacement capacitor is connectable to an electric circuit with selectable capacitance values. The capacitor provides multiple capacitance values that may be connected in the field to replace the capacitance value or values of a failed capacitor or capacitors.

In one aspect, an apparatus is disclosed which includes an electrolytic capacitive element with multiple capacitor sections.

In another aspect, the disclosure features a system that provides a plurality of selectable capacitance values. The system includes a electrolytic capacitive element that has a plurality of capacitor sections. Each capacitor section has a capacitance value and a capacitor section terminal at a first end. The electrolytic capacitive element has a common element terminal at a second end. The system also includes a plurality of insulated capacitor section wires each connected at one end to a respective section terminal of one of the plurality of capacitor sections, and an insulated common conductor connected at one end to the common element terminal of the capacitor element. The system also includes a case having a side wall, a bottom wall and an open top. The electrolytic capacitive element and the insulated wires and insulated conductor connected thereto are received in the case with the common element terminal adjacent to and insulated from the bottom wall. The system also includes a pressure interrupter cover assembly that includes a deformable cover, a common cover terminal mounted to the deformable cover generally at the center of the cover, a plurality of capacitor section cover terminals mounted to the deformable cover at spaced apart positions generally surrounding the common cover terminal, and connections connecting the terminal post of the common cover terminal to the conductor extending from the common element terminal, and connections respectively connecting the plurality of capacitor section wires to a corresponding terminal post of the plurality of capacitor section cover terminals. The deformable cover has a peripheral edge sealingly secured to an upper end of the case. The common cover terminal has a contact extending upwardly from the cover and a terminal post extending downwardly from the cover to a distal end. Each capacitor section cover terminal has at least two contacts extending upwardly from the cover and a terminal post extending downwardly from the cover to a distal end thereof. Selectable capacitance values are provided by connecting selected cover terminals to place the corresponding capacitor sections in one or more electric circuits and wherein failure of the electrolytic capacitive element causes the deformable cover to deform.

In another aspect, the disclosure features a system that provides a plurality of selectable capacitance values. The system includes an electrolytic capacitive element having a plurality of capacitors, a plurality of insulated capacitor wires each connected at one end to a respective capacitor terminal of the capacitors, and an insulated common conductor connected at one end to the common element terminal of the electrolytic capacitive element, a case having a side wall, a bottom wall and an open top, and a pressure interrupter cover assembly. Each capacitor has a capacitance value and a capacitor terminal at a first end. The electrolytic capacitive element has a common element terminal at a second end. The electrolytic capacitive element, the insulated wires, and insulated conductor are received in the case with the common element terminal adjacent to and insulated from the bottom wall of the case. The pressure cover assembly includes a deformable cover, a common cover terminal mounted to the deformable cover generally at the center of the cover, a plurality of capacitor cover terminals mounted to the deformable cover at spaced apart positions generally surrounding the common cover terminal, and connections connecting the terminal post of the common cover terminal to the conductor extending from the common element terminal, and connections respectively connecting the plurality of capacitor wires to a corresponding terminal post of the plurality of capacitor cover terminals. The deformable cover has a peripheral edge sealingly secured to an upper end of the case. The common cover terminal has a contact extending upwardly from the cover and a terminal post extending downwardly from the cover to a distal end. Each capacitor cover terminal has at least two contacts extending upwardly from the cover and a terminal post extending downwardly from the cover to a distal end thereof. The selectable capacitance values are provided by connecting selected cover terminals to place the corresponding capacitors in one or more electric circuits and wherein failure of the electrolytic capacitive element causes the deformable cover to deform.

In another aspect, the disclosure features a system that provides a plurality of selectable capacitance values. The system includes an electrolytic capacitive element having a plurality of capacitors, a plurality of insulated capacitor wires each connected at one end to a respective first capacitor terminal of one of the capacitors, and an insulated common conductor connected at one end to all of the second capacitor terminals of all capacitors, a case having a side wall, a bottom wall and an open top, a pressure interrupter cover assembly, and connections connecting the terminal post of the common cover terminal to the conductor extending from the second capacitor terminals, and connections respectively connecting the plurality of capacitor wires to a corresponding terminal post of the plurality of capacitor cover terminals. Each capacitor has a capacitance value and a first capacitor terminal at a first end of each capacitor and a second capacitor terminal at a second end of each capacitor. The electrolytic capacitive element and the insulated wires and insulated conductor connected thereto are received in the case. The pressure interrupter cover assembly includes a deformable cover, a common cover terminal mounted to the deformable cover generally at the center of the cover, a plurality of capacitor cover terminals mounted to the deformable cover at spaced apart positions generally surrounding the common cover terminal, and connections connecting the terminal post of the common cover terminal to the conductor extending from the second capacitor terminals, and connections respectively connecting the plurality of capacitor wires to a corresponding terminal post of the plurality of capacitor cover terminals. The deformable cover has a peripheral edge sealingly secured to an upper end of the case. The common cover terminal has a contact extending upwardly from the cover and a terminal post extending downwardly from the cover to a distal end. Each capacitor cover terminal having at least two contacts extending upwardly from the cover and a terminal post extending downwardly from the cover to a distal end thereof. The selectable capacitance values are provided by connecting selected cover terminals to place the corresponding capacitors in one or more electric circuits and wherein failure of the electrolytic capacitive element causes the deformable cover to deform.

In another aspect, the disclosure features a system that provides a plurality of selectable capacitance values. The system includes an electrolytic capacitive element having a plurality of capacitors, a plurality of insulated capacitor wires each connected at one end to a respective first capacitor terminal of the capacitors, and an insulated common conductor connected at one end to all of the second capacitor terminals of all capacitors, a case having a cylindrical side wall, a bottom wall and an open top, a cover assembly, and connections connecting the terminal post of the common cover terminal to the conductor extending from the second capacitor terminals, and connections respectively connecting the other ends of the capacitor wires to a corresponding terminal post of the capacitor cover terminals. Each capacitor has a capacitance value and a first capacitor terminal at a first end of each capacitor and a second capacitor terminal at a second end of each capacitor. The electrolytic capacitive element, the insulated wires, and insulated conductor are received in the case. The cover assembly includes a deformable cover, a common cover terminal mounted to the deformable cover, a plurality of capacitor cover terminals mounted to the deformable cover at spaced apart positions surrounding the common cover terminal. The deformable cover has a peripheral edge sealingly secured to an upper end of the case. The common cover terminal has a contact extending upwardly from the cover and a terminal post extending downwardly from the cover. Each capacitor cover terminal having at least two contacts extending upwardly from the cover and a terminal post extending downwardly from the cover. A first selectable capacitance values between 2.5 microfarads and 10 microfarads and a second capacitance values between 2.5 microfarads to 65 microfarads are provided by connecting selected cover terminals to place the corresponding capacitive sections in one or more electric circuits.

Embodiments and/or aspects may include any one or more of the following features. The electrolytic capacitive element can be cylindrically wound and the plurality of capacitor sections can be concentric. The system can include an insulating fluid in the case at least partially surrounding the capacitive element. The system can include a cover insulating barrier mounted on the deformable metal cover. The cover insulation barrier has a barrier cup substantially surrounding the cover terminal and a plurality of barrier fins, each extending radially outwardly from the barrier cup and deployed between adjacent section cover terminals. The system can include a rigid disconnect plate supported below the deformable cover. The rigid disconnect plate defines openings accommodating the terminal posts and exposing the distal ends. The system can also include a conductor frangibly connecting the common element terminal of the electrolytic capacitive element to the common cover terminal and conductors respectively frangibly connecting the capacitor section terminals to the section cover terminals. The capacitor sections can have capacitance values in the range of about 2.5 microfarads to about 25 microfarads. The capacitors can have capacitance values in the range of about 2.5 microfarads to about 25 microfarads. The electrolytic capacitive element can include more than five capacitors. The capacitor that have the largest capacitance value can be one of the outer three capacitors of the electrolytic capacitance element. The capacitors can have capacitance values of about 2.5 microfarads, about 5.0 microfarads, about 10.0 microfarads, about 20.0 microfarads, and about 25 microfarads. The electrolytic element can provide dual capacitance values.

Unless otherwise defined, all technical and scientific terms used herein have the same meaning as commonly understood by one of ordinary skill in the art to which this invention belongs. In case of conflict with any document incorporated by reference, the present disclosure controls.

Other features and advantages will be apparent from the following detailed description.

DESCRIPTION OF DRAWINGS

FIG. 19 is a chart showing the single value capacitance values that may be provided by the capacitor of FIG. 1e.

FIG. 20 is a chart showing dual value capacitances that may be provided by the capacitor of FIG. 1.

FIG. 21 is another chart showing dual value capacitances that may be provided by the capacitor of FIG. 1e.

FIG. 22 is another chart showing dual value capacitances that may be provided by the capacitor of FIG. 1e.

FIG. 23 is another chart showing dual value capacitances that may be provided by the capacitor of FIG. 1e.

FIG. 24 is a chart showing single value capacitances that may be provided by the capacitor of FIG. 1e.

DETAILED DESCRIPTION

A desirable replacement capacitor would have the electrical and physical characteristics of the failed capacitor, i.e. it should provide the same capacitance value or values at the same or higher voltage rating, be connectable using the same leads and be mountable on the same brackets or other mounting provision. It should also have the same safety protection, for example, as confirmed by independent tests performed by Underwriter Laboratories or others.

In some applications, the failed capacitor has a relatively high capacitance value, e.g., tens or hundreds of microfarads. In such cases, the replacement capacitor may be an electrolytic capacitor. Electrolytic capacitors generally have higher capacitance values than other types of capacitors.

Figure 1A:
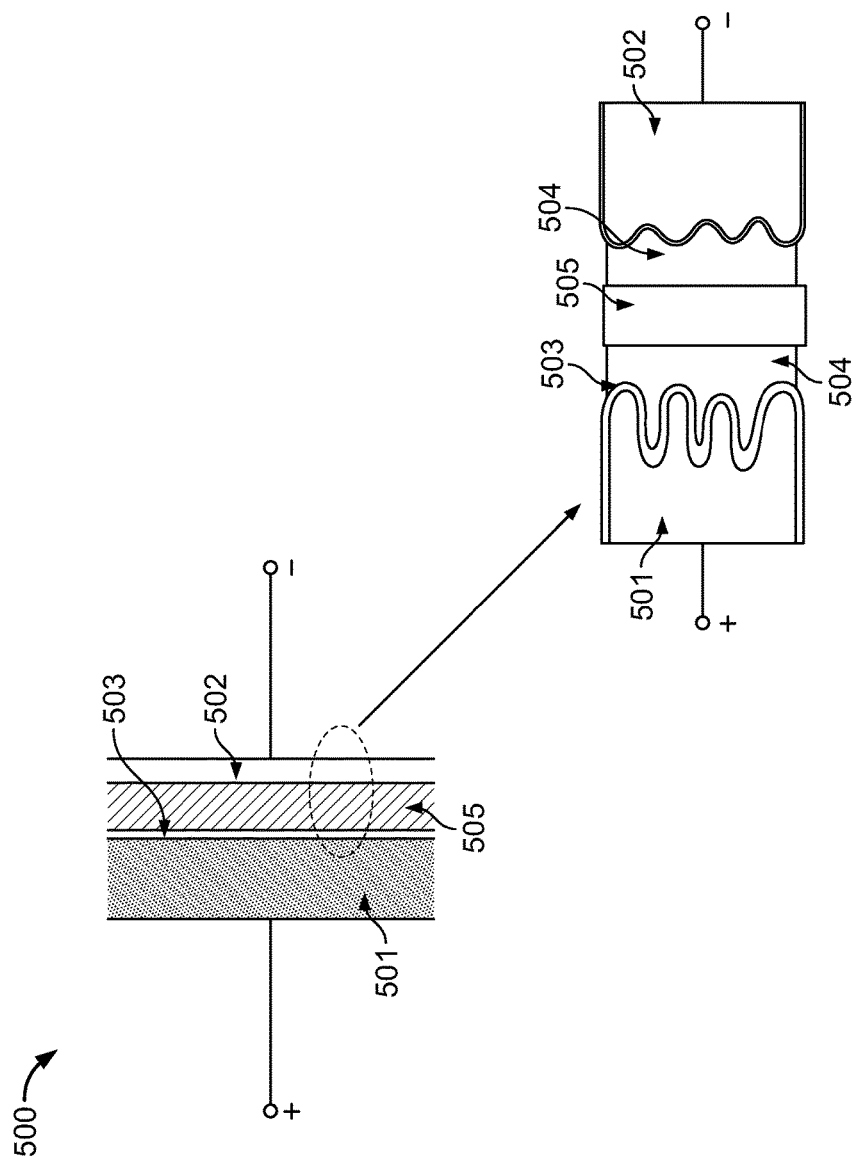
FIG. 1a is a schematic of an electrolytic capacitor.

Referring FIG. 1a, an electrolytic capacitor 500 includes two electrically conductive material layers 501 and 502 (e.g. aluminum foils, tantalum foils, etc.) that are separated by a dielectric layer 503. For example, as shown, one electrode 501 (the anode) is formed by an aluminum foil. An oxide layer 503 (e.g., $Al_2O_3$) is built up on the anode layer, thereby providing a dielectric. The counter electrode (the cathode) is a conductive liquid 504 (e.g., an electrolyte). A second aluminum foil 502 (the cathode foil) is placed in electrical contact with the liquid. In typical embodiments, the conductive liquid 504 is provided by placing an electrolyte soaked paper 505 between the anode and the cathode foil, as shown.

In general, a larger capacitance may be obtained by either increasing the dielectric constant, increasing the electrode surface area, or by decreasing the distance between the electrodes of a capacitor. In typical embodiments, the dielectric oxide layer 503 is formed by performing anode oxidation using electrolysis in an electrolytic solution (note, this electrolytic solution is generally different from the electrolyte used for the conducting fluid of the cathode). Generally, the electrolytic solution is an aqueous solution such as ammonium boric acid or ammonium phosphate. Generally, the thickness of the grown thin film is nearly proportional to the applied voltage used in the electrolysis process. The dielectric properties of the film generally depend on the details of the formations process. The dielectric constant of a typical aluminum oxide layer can range between 7 and 8 times the permittivity of free space.

As shown in FIG. 1a, in the electrolytic capacitor the conductive liquid 504 flows into intimate contact with the dielectric oxide layer 503 on the anode foil 501, thereby minimizing the distance between the cathode 502 and anode 501.

The surface area of the anode layer 501 can be increased by roughing the surface using an etching process (e.g., physical etching using an acid such as hydrochloric acid, or electrochemical etching). By roughening the surface of, for example, a high-purity aluminum foil, the effective surface area of aluminum electrolytic capacitors can be increased by as much as 120 times.

The above described features make it possible to produce electrolytic capacitors with capacitances far larger than those of other types of capacitors.

Figure 1B:
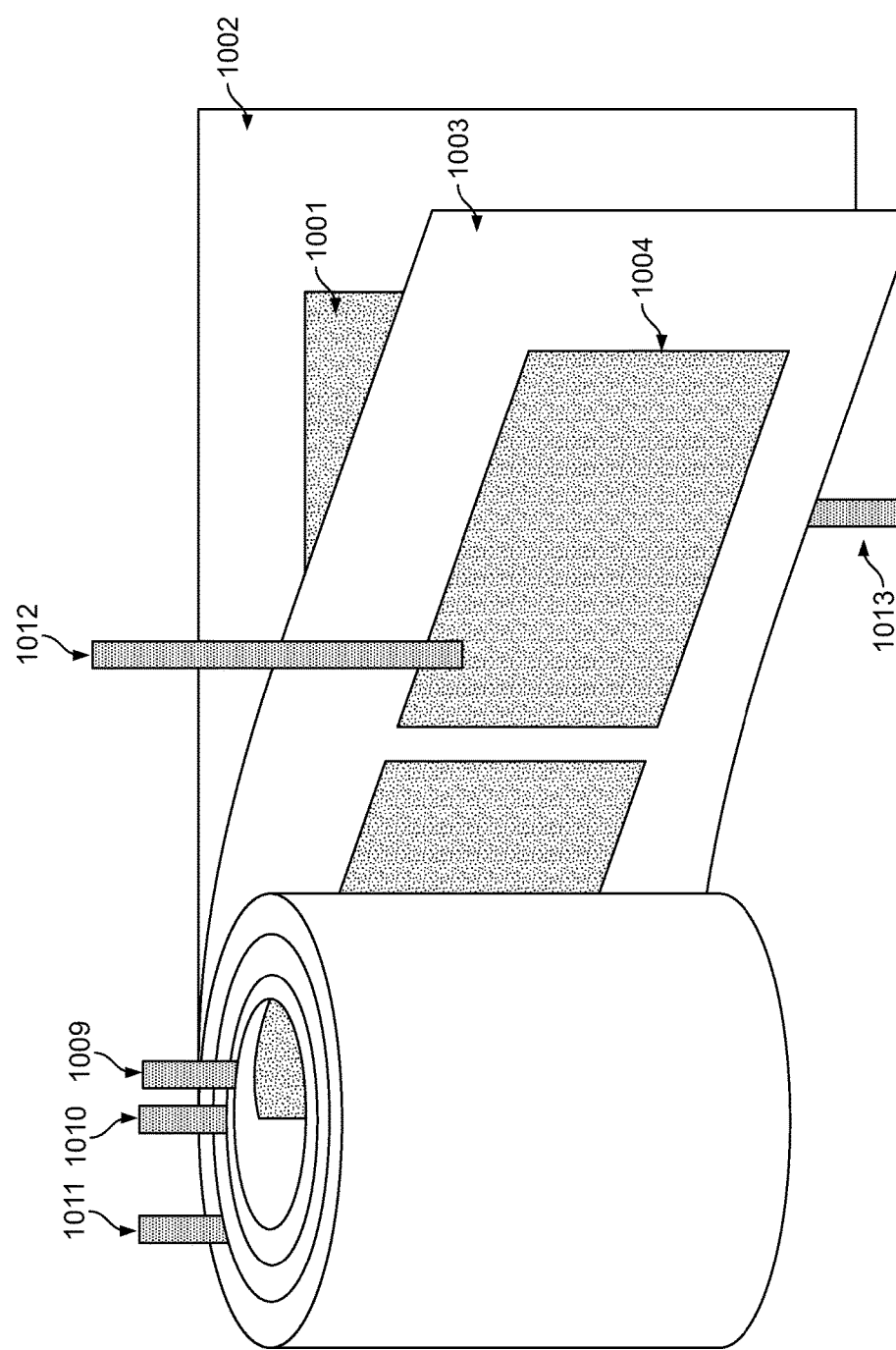
FIG. 1b is a schematic of a wound electrolytic capacitive element with multiple capacitor sections.

FIG. 1b shows a schematic diagram of a wound, multi-section aluminum foil electrolytic capacitive element. Each of the multiple capacitor sections has a capacitance value. One or more of the sections can be connected to an electrical circuit to provide a desired capacitance.

Figure 1C:
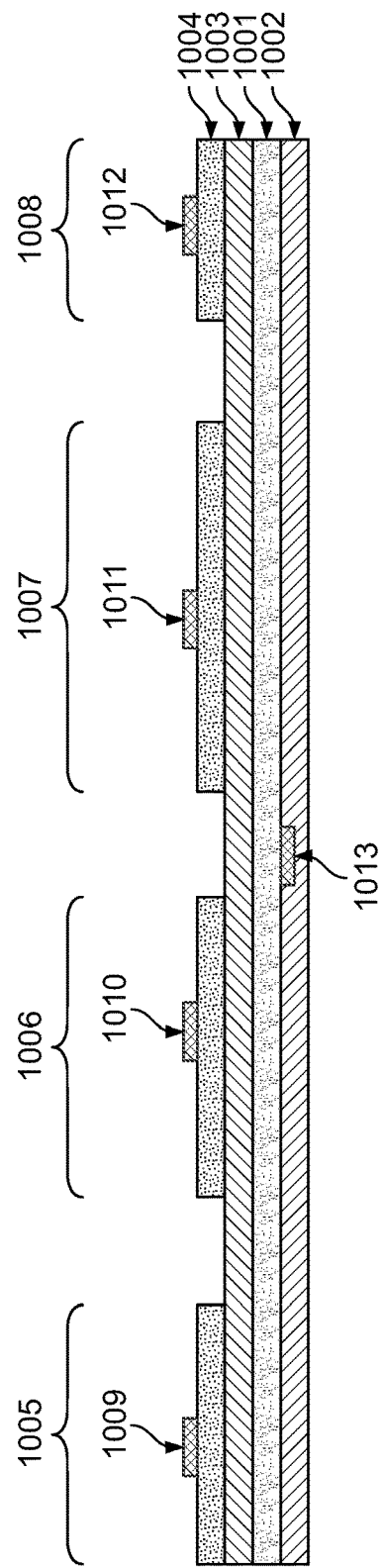
FIG. 1c is a schematic of an unwound electrolytic capacitive element with multiple capacitor sections with a common cathode.

FIG. 1c shows the capacitive element of FIG. 1b unwound. Aluminum cathode foil 1001 is placed upon nonconductive spacer paper 1002. Electrolyte soaked paper 1003 is placed upon cathode foil 1001. Aluminum anode foil 1004, which includes an oxide layer on its bottom face, is placed on top of electrolyte soaked paper 1003. Anode foil 1004 is cut into sections, thereby forming multiple capacitive sections 1005, 1006, 1007, 1008. Each section includes a distinct anode and dielectric, and all four section share a common cathode. The capacitance of each section depends on, for example, the surface area of the corresponding anode. Thus, capacitive sections can be provided with various desired capacitance values by, for example, cutting the cathode foil strip into sections of varying length.

Tabs 1009, 1010, 1011, and 1012 are placed in electrical contact with the anode foil of capacitive sections 1005, 1006, 1007, and 1008 respectively. Tab 1013 is placed in electrical contact with cathode foil 1001. For example, in some embodiments the tabs are crimped to the corresponding foil. Although four sections are shown, it is to be understood that more or fewer sections may be provided.

Figure 1D:
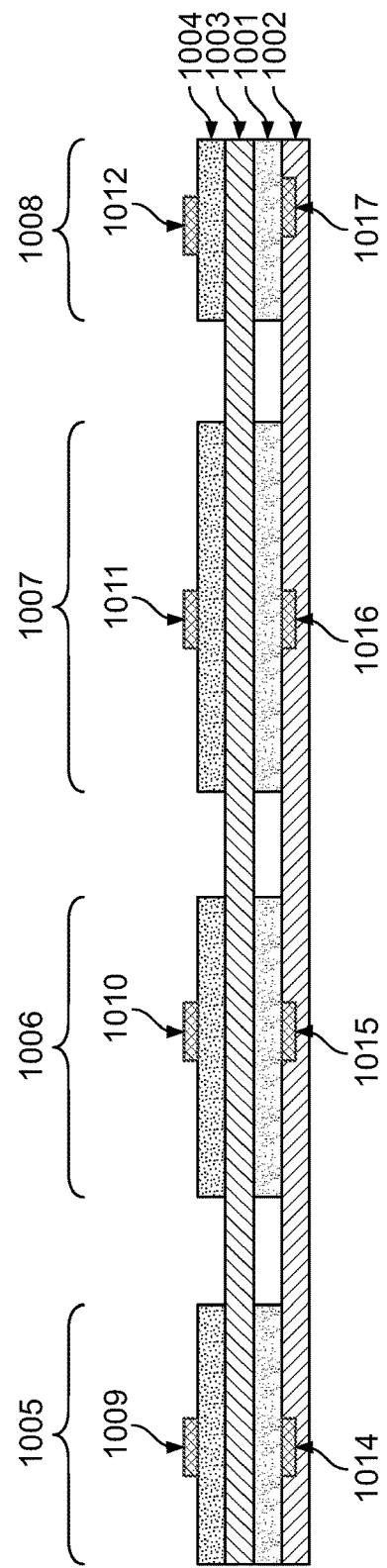
FIG. 1d is a schematic of an unwound electrolytic capacitive element with multiple capacitor sections with separate cathodes.

In some embodiments, it is desirable that each section include an independent cathode. In such cases cathode foil 1001 is cut into sections, as shown in FIG. 1*d*. Tabs 1013, 1014, 1015, and 1016 are placed in contact with the cathode foils of are placed in electrical connection with the cathode foil of capacitive sections 1005, 1006, 1007, and 1008 respectively.

In some embodiments, electrolyte soaked paper 1003 may be cut into sections along with the anode and/or cathode foils.

In general, in various embodiments, the position of the anode and cathode foils can be reversed.

In some embodiments, electrical connections other than tabs are used. For example, wires may be connected directly to the foils using, e.g. soldering. Although four sections are shown, it is to be understood that more or fewer sections may be provided.

Referring back to FIG. 1*b*, in a wound configuration, paper spacer 1002 insulates the capacitor sections from each other. Tabs 1009, 1010, 1011, and 1012 extend beyond the top of wound paper spacer 1002 allowing electrical connection with the anodes of capacitor sections 1005, 1006, 1007, and 1008 respectively. Tab 1013 extends beyond the bottom of wound paper spacer 1002, allowing electrical connection with the common cathode 1001.

Figure 1E:
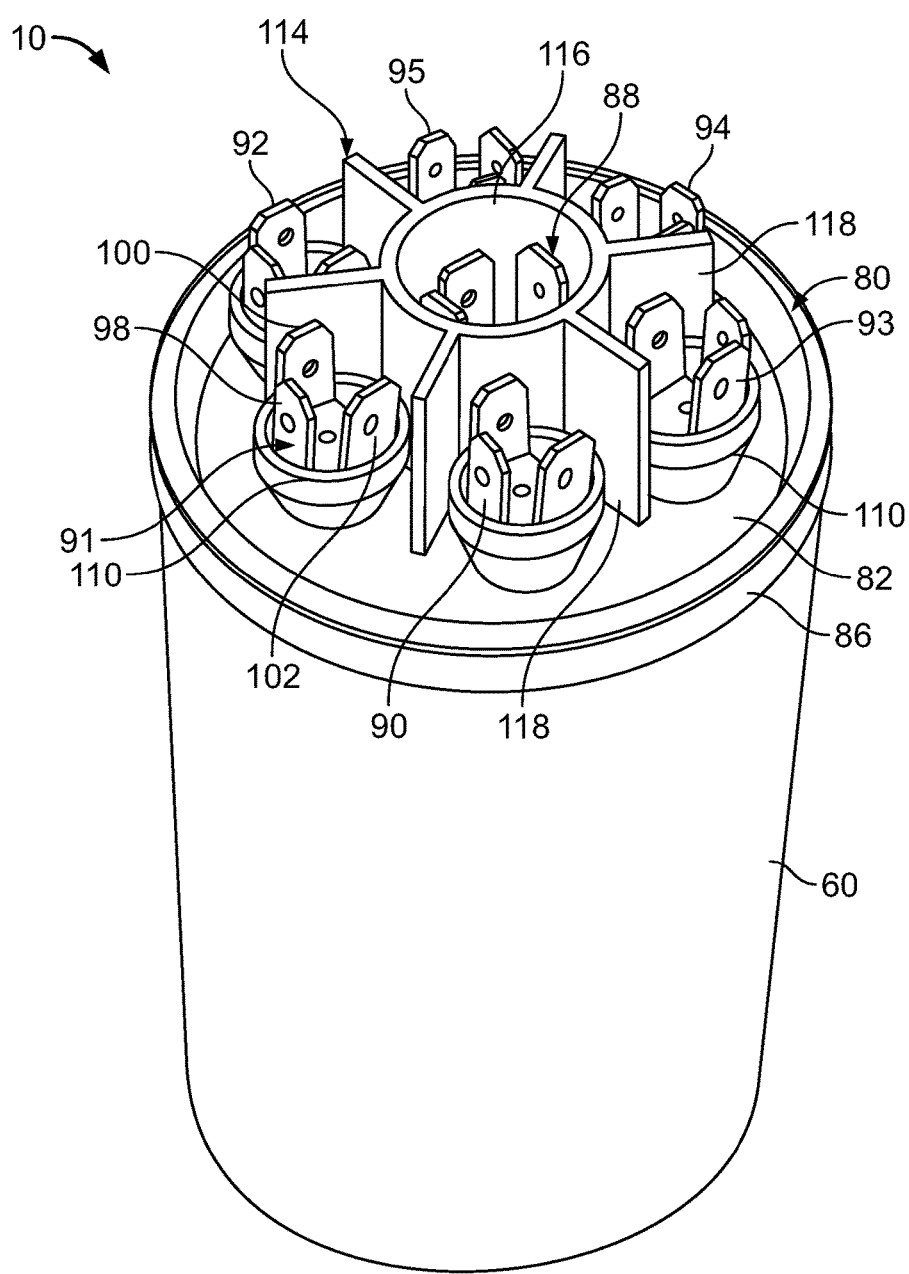
FIG. 1e is a perspective view of a capacitor.
Figure 2:
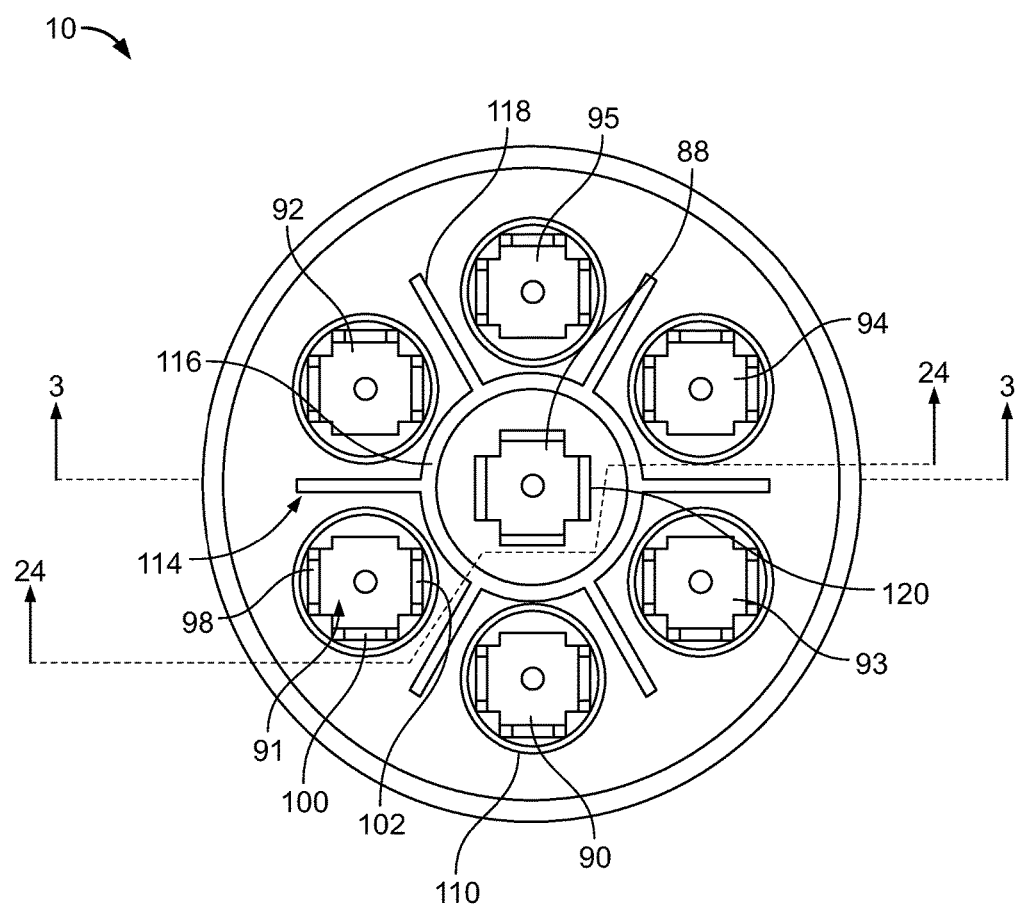
FIG. 2 is a top view of the capacitor of FIG. 1e.
Figure 3:
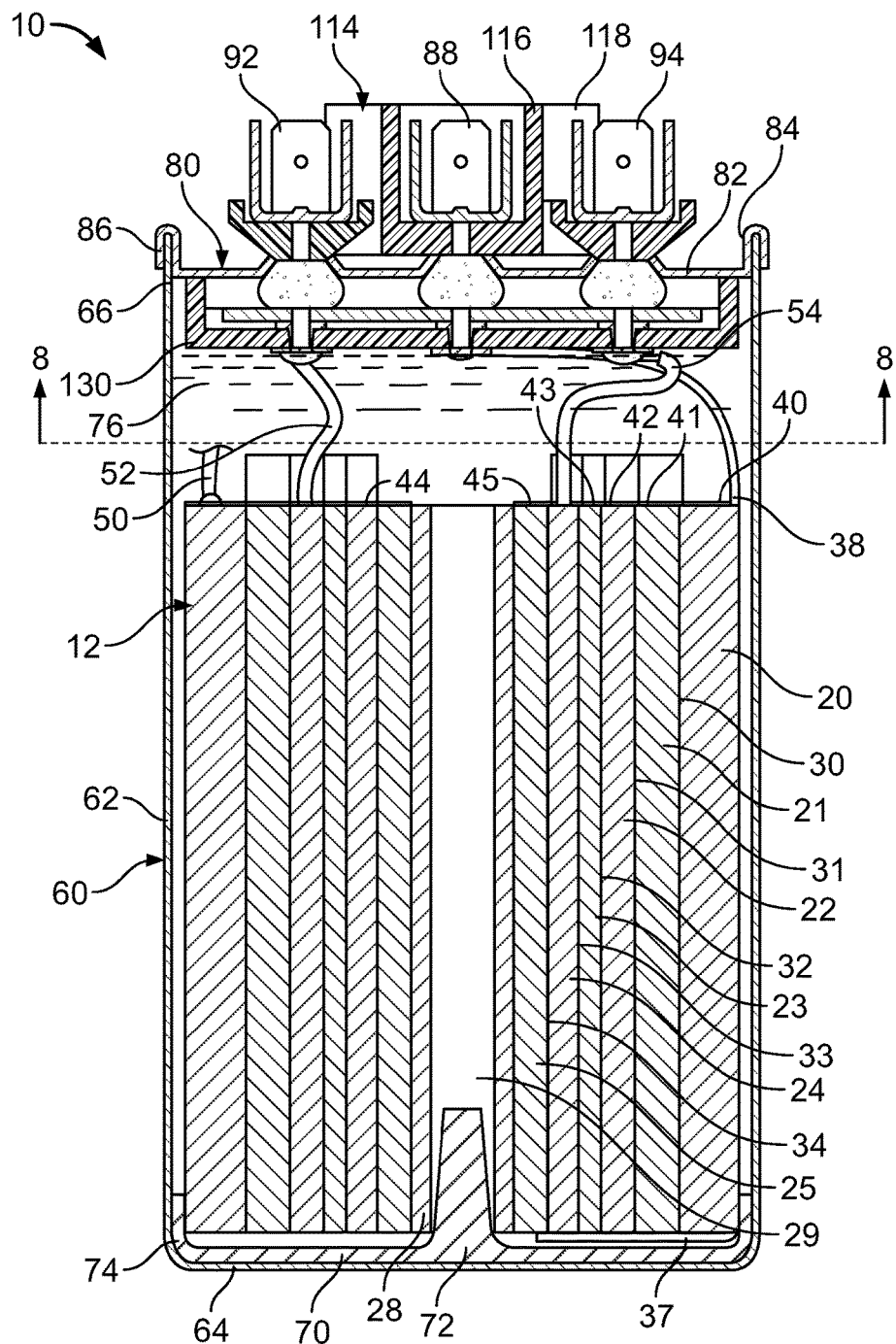
FIG. 3 is a sectional view of the capacitor of FIG. 1e, taken along the lines 3-3 of FIG. 2.

A capacitor 10 is shown in FIGS. 1*e*, 2 and 3 as well as in other figures to be described below. The capacitor 10 is adapted to replace any one of a large number of capacitors. Therefore, a serviceman may carry a capacitor 10 on a service call and, upon encountering a failed capacitor, the serviceman can utilize the capacitor 10 to replace the failed capacitor with the capacitor 10 being connected to provide the same capacitance value or values of the failed capacitor.

Figure 4:
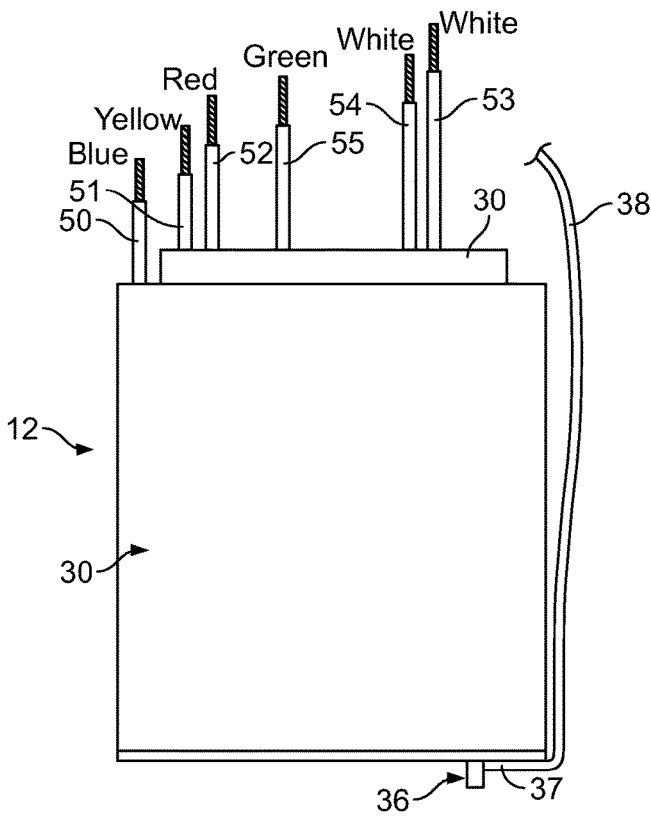
FIG. 4 is a side elevation view of the capacitive element of the capacitor of FIG. 1e, including wire conductors connected to the capacitor sections thereof.
Figure 5:
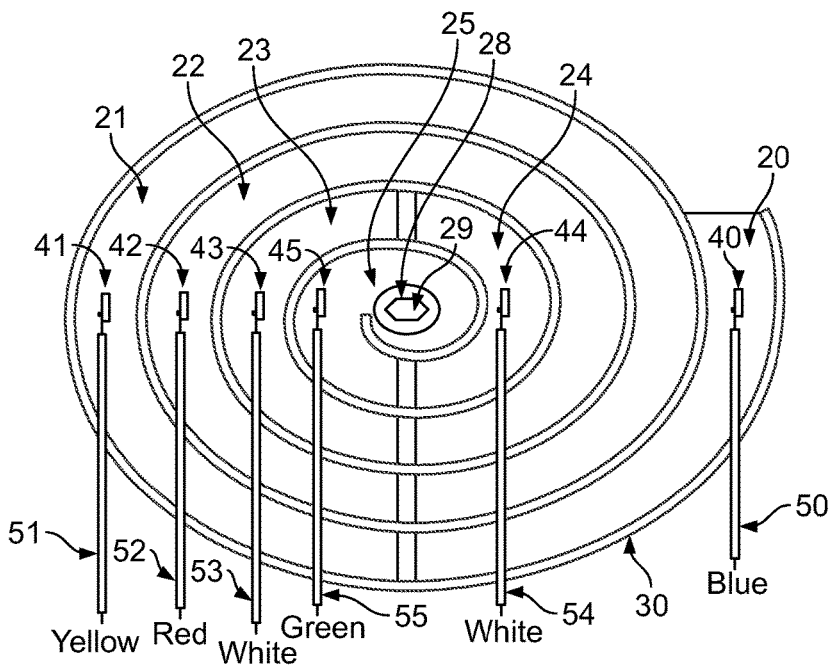
FIG. 5 is a top view of the capacitive element of the capacitor of FIG. 1e, including wire conductors connected to capacitor sections thereof.

The capacitor 10 has a wound electrolytic capacitive element 12 of the type described above having a plurality of capacitor sections, each having a capacitance value. The capacitive element 12 is also shown in FIGS. 4 and 5. In an embodiment described herein, the capacitive element 12 has six capacitor sections 20, 21, 22, 23, 24, and 25. As described above, each capacitive element includes an oxide coated anode foil, an electrolyte soaked paper, and a cathode foil, layered upon each other. Separate anodes are provided for each section by, for example, cutting the anode foil into sections as described above. In the pictured embodiment, the capacitor sections share a common cathode. In some embodiments, each capacitor section can have a separate cathode. In certain embodiments, the electrolytic capacitive element 12 has six capacitor sections 20-25. The electrolytic capacitive element 12 is a wound cylindrical element. Accordingly, the capacitive element 12 has a central spool or mandrel 28, which has a central opening 29. An element insulation barrier 30 is provided to separate the six capacitor sections 20-25. In some embodiments, the element insulation barrier corresponds to paper 1002 shown in FIG. 1*b*. In some embodiments, the element insulation barrier may be insulating polymer sheet material, for example polypropylene.

With reference to FIGS. 3, 4 and 5, at the lower end of the capacitance element 12, an element common cathode terminal 36 is established by contacting a tab in electrical contact with common cathode foil of the capacitive element to foil strip conductor 38 at 37. In embodiments featuring separate cathodes for each of the multiple capacitor sections, multiple cathode terminals are provided.

At the top end of the capacitive element 12 as depicted in FIGS. 3, 4 and 5, the element insulation barrier 30 extends above the wound aluminum foils of the capacitor sections. An individual capacitor element section terminal tab is provided for each of the capacitive sections 20-25. The element section terminal tabs are identified by numerals 40-45. Each element section terminal tab is electrical in contact with the anode foil of the corresponding capacitor section. Element section terminals tabs 40-45 are respectively deployed on the capacitor sections 20-25.

Conductors preferably in the form of six insulated wires 50-55 each have one of their ends respectively soldered to the element section terminal tabs 40-45, as best seen in FIG. 5.

The insulation of the wires 50-55 is color coded to facilitate identifying which wire is connected to which capacitor section. Wire 50 connected to element section terminal 40 of capacitor section 20 has blue insulation, wire 51 connected to element section terminal 41 of capacitor section 21 has yellow insulation, wire 52 connected to element section terminal 42 of capacitor section 22 has red insulation, wire 53 connected to element section terminal 43 of capacitor section 23 has white insulation, wire 54 connection to element section terminal 44 of capacitor section 24 has white insulation, and wire 55 connected to element section terminal 45 of capacitor section 25 has green insulation. These colors are indicated on FIG. 4.

The capacitive element 12 is further provided with foil strip conductor 38, having one end attached to the element common cathode terminal 36 at 37. The foil strip conductor 38 is coated with insulation, except for the point of attachment 37 and the distal end 39 thereof. If desired, foil or wire conductors may be utilized for all connections.

In the capacitive element 12 used in the capacitor 10, the capacitor section 20 has a value of approximately 25.0 microfarads and the capacitor section 21 has a capacitance of approximately 20.0 microfarads. The capacitor section 22 has a capacitance of approximately 10.0 microfarads. The capacitor section 23 has a capacitance of approximately 5.5 microfarads, but is identified as having a capacitance of 5.0 microfarads for purposes further discussed below. The capacitor section 24 has a capacitance of approximately 4.5 microfarads but is labeled as having a capacitance of 5 microfarads, again for purposes described below. The capacitor section 25 has a capacitance of approximately 2.8 microfarads.

The capacitor 10 also has a case 60, best seen in FIGS. 1-3, having a cylindrical side wall 62, a bottom wall 64, and an open top 66 of side wall 62. The case 60 is formed of aluminum and the cylindrical side wall 62 has an outside diameter of 2.50 inches. This is a very common diameter for capacitors of this type, wherein the capacitor 10 will be readily received in the mounting space and with the mounting hardware provided for the capacitor being replaced. Other diameters may, however, be used, and the case may also be plastic or of other suitable material.

The capacitive element 12 with the wires 50-55 and the foil strip 38 are received in the case 60 with the element common terminal 36 adjacent the bottom wall 64 of the case. An insulating bottom cup 70 is preferably provided for insulating the capacitive element from the bottom wall 64, the bottom cup 70 having a center post 72 that is received in the center opening 29 of the mandrel 28, and an up-turned skirt 74 that embraces the lower side wall of the cylindrical capacitive element 12 and spaces it from the side wall 62 of the case 60.

In some embodiments, an insulating fluid 76 is provided within the case 60, at least partly and preferably substantially surrounding the capacitive element 12. The fluid 76 may be the fluid described in U.S. Pat. No. 6,014,308, incorporated herein by reference. The fluid may be one of the other insulating fluids used in the trade, such as polybutene or insulating oil. The fluid may be replaced by other types of insulating materials such as, for example, dielectric greases.

Figure 9:
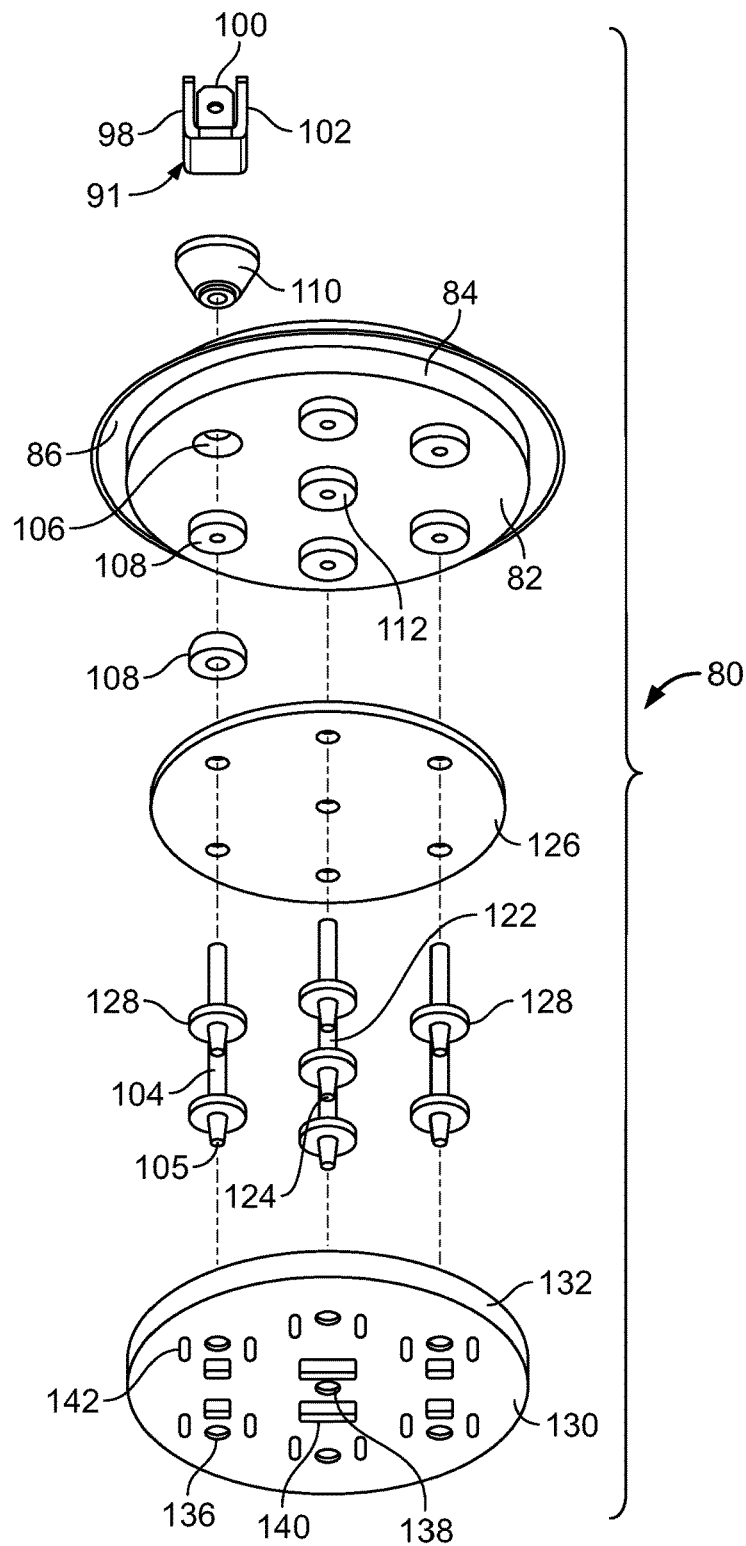
FIG. 9 is an exploded perspective view of the pressure interrupter cover assembly of the capacitor of FIG. 1e.
Figure 10:
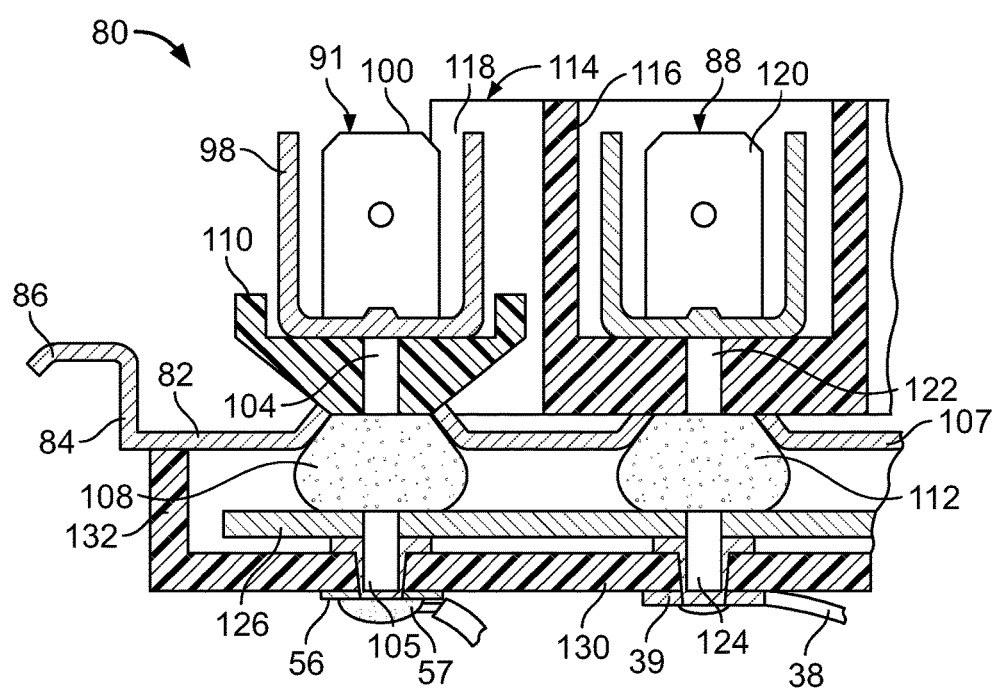
FIG. 10 is an enlarged fragmentary view of the pressure interrupter cover assembly of the capacitor of FIG. 1e.

The capacitor 10 also has a pressure interrupter cover assembly 80 best seen in FIGS. 1-3, 8-10 and 24. The cover assembly 80 includes a deformable circular cover 82 having an upstanding cylindrical skirt 84 and a peripheral rim 86 as best seen in FIGS. 9 and 10. The skirt 84 fits into the open top 66 cylindrical side wall 62 of case 60, and the peripheral rim 86 is crimped to the open top 66 of the case 60 to seal the interior of the capacitor 10 and the fluid 76 contained therein, as shown in FIGS. 1 and 3.

The pressure interrupter cover assembly 80 includes seven cover terminals mounted on the deformable cover 82. A common cathode cover terminal 88 is mounted generally centrally on the cover 82, and section cover terminals 90-95, each respectively corresponding to one of the capacitor sections 20-25, are mounted at spaced apart locations surrounding the common cover terminal 88. In embodiments featuring separate cathodes for each capacitor section, multiple cathode terminals are provided. With particular reference to FIGS. 1, 2, 9 and 10, the section cover terminal 91 has three upstanding blades 98, 100 and 102 mounted on the upper end of a terminal post 104. Terminal post 104 has a distal end 105, opposite the blades 98, 100 and 102. The cover 82 has an opening 106 for accommodating the terminal post 104, and has a beveled lip 107 surrounding the opening. A shaped silicone insulator 108 fits under the cover in the beveled lip 107 and the terminal post 104 passes through the insulator 108. On the upper side of the cover, an insulator cup 110 also surrounds the post 104, and the insulator cup 110 sits atop the silicone insulator 108; thus, the terminal 91 and its terminal post 104 are well insulated from the cover 82. The other cover section terminals 92-95 are similarly mounted with an insulator cup and a silicone insulator.

The common cathode cover terminal 88 has four blades 120, and a terminal post 122 that passes through a silicone insulator 112. The common cathode cover terminal 88 mounts cover insulator barrier 114 that includes an elongated cylindrical center barrier cup 116 surrounding and extending above the blades 120 of the common cathode cover terminal 88, and six barrier fins 118 that extend respectively radially outwardly from the elongated center barrier cup 116 such that they are deployed between adjacent section cover terminals 90-95. This provides additional protection against any arcing or bridging contact between adjacent section cover terminals or with the common cathode cover terminal 88. Alternatively, the common cathode cover terminal 88 may be provided with an insulator cup 116, preferably extending above blades 120 but with no separating barrier fins, although the barrier fins 118 are preferred. The terminal post 122 extends through an opening in the bottom of the base 117 of the insulating barrier cup 116, and through the silicone insulator 112, to a distal end 124.

The pressure interrupter cover assembly 80 has a fiberboard disc 126 through which the terminal posts 122, terminal post 104 and the terminal posts of the other section cover terminals extend. The disc 126 may be also fabricated of other suitable material, such as polymers. The terminal posts 104, 122, etc. are configured as rivets with rivet flanges 128 for assembly purposes. The terminal posts 104, 122, etc. are inserted through the disc 126, insulators 108, 112, insulator cups 110 and barrier cup 116, and the cover terminals 88, 90-95 are spot welded to the ends of the rivets opposite the rivet flanges 128. Thus, the rivet flanges 128 secure the cover terminals 88, 90-95 in the cover 82, together with the insulator barrier 114, insulator cups 110 and silicone insulators 108, 112. The fiberboard disc 126 facilitates this assembly, but may be omitted, if desired. The distal ends of the terminal posts are preferably exposed below the rivet flanges 128.

The cover assembly 80 has a disconnect plate 130, perhaps best seen in FIGS. 3, 9 and 10. The disconnect plate 130 is made of a rigid insulating material, such as a phenolic, is spaced below the cover 82 by a spacer 134 in the form of a skirt. The disconnect plate 130 is provided with openings accommodating the distal ends of the terminal posts, such as opening 136 accommodating the distal end 105 of terminal post 104 and opening 138 accommodating the distal end 124 of the terminal post 122. With particular reference to FIG. 9, the disconnect plate 130 may be provided with raised guides, such as linear guides 140 and dimple guides 142, generally adjacent the openings accommodating the distal ends of terminal posts. These guides are for positioning purposes as discussed below.

In capacitor 10, the distal end 39 of the foil strip 38 is connected to the distal end 124 of terminal post 122 by welding. In some embodiments, the conductors between the capacitor sections and the terminal posts are foil strips, such as the one used for the common cathode terminal 36 of the capacitive element 12 herein. The foil strips are positioned on a breaker plate over the distal ends of terminal posts, and are welded to the distal ends of the terminal posts.

Figure 6:
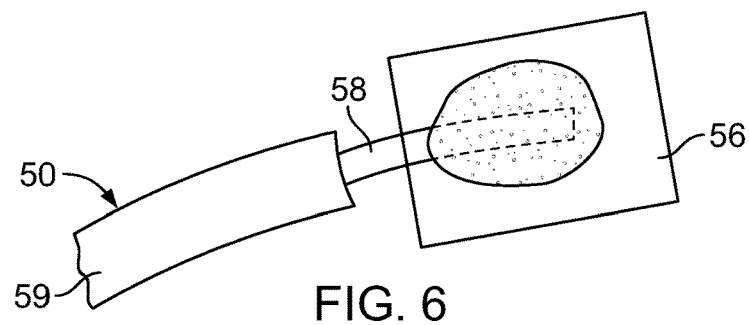
FIG. 6 is an enlarged fragmentary plan view of a distal end of a wire conductor of FIGS. 4 and 5, connected to a foil tab.
Figure 7:
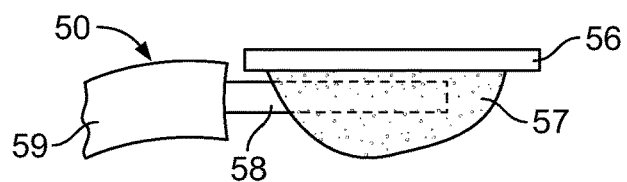
FIG. 7 is an enlarged fragmentary side view of a distal end of a wire conductor of FIGS. 4 and 5, connected to a foil tab.
Figure 8:
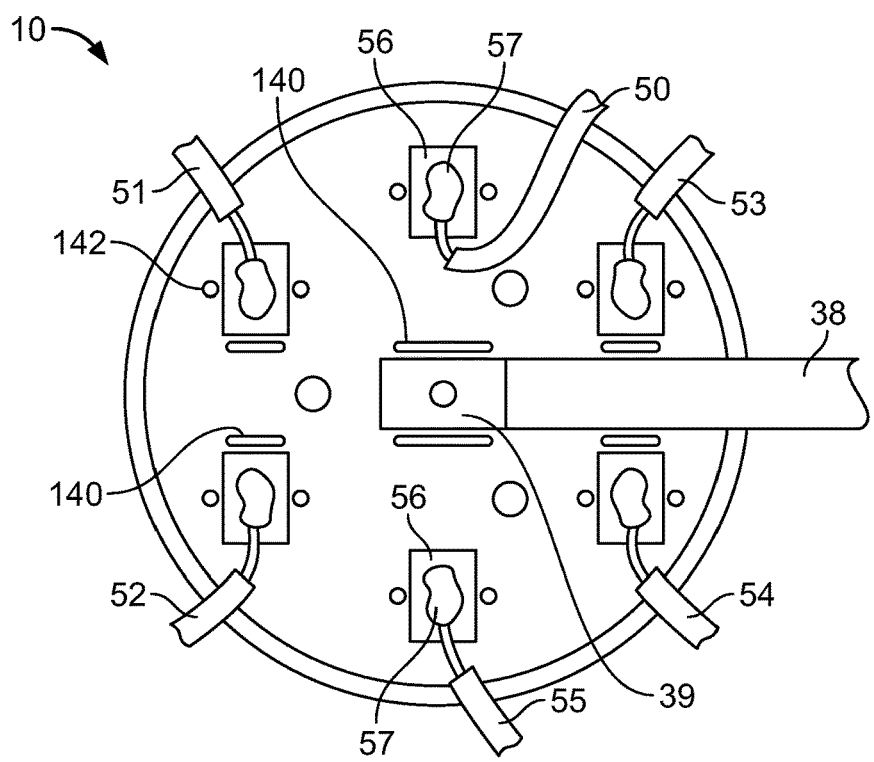
FIG. 8 is a sectional view of the capacitor of FIG. 1e taken along the lines 8-8 of FIG. 3, and showing a pressure interrupter cover assembly of the capacitor of FIG. 1e.

The wires 50-55, in the pictured embodiment, are not well-configured for welding to the distal ends of the terminal posts of the cover section terminals. However, the wires 50-55 are desirable in place of foil strips because they are better accommodated in the case 60 and have good insulating properties, resist nicking and are readily available with colored insulations. In order to make the necessary connection of the wires 50-55 to their respective terminal posts, foil tabs 56 are welded to each of the distal ends of the terminal posts of the section cover terminals 90-95, and the guides 140, 142 are helpful in positioning the foil tabs 56 for the welding procedure. The attachment may be accomplished by welding the distal end of a foil strip to the terminal post, and then cutting the foil strip to leave the foil tab 56. Thereafter, and as best seen in FIGS. 6, 7 and 10, the conductor 58 of wire 50 is soldered to the tab 56, by solder 57. The insulation 59 of wire 50 has been stripped to expose the conductor 58. The other wires 51-55 are similarly connected to their respective cover section terminals. Alternatively, the foil tabs may be soldered to the wires and the tabs may then be welded to the terminal posts, if desired, or other conductive attachment may be employed.

Accordingly, each of the capacitor sections 20-25 is connected to a corresponding section cover terminal 90-95 by a respective one of color coded wires 50-55. The insulator cups 10 associated with each of the section cover terminals 90-95 are also color coded, using the same color scheme as used in the wires 50-55. This facilitates assembly, in that each capacitor section and its wire conductor are readily associated with the correct corresponding section cover terminal, so that the correct capacitor sections can be identified on the cover to make the desired connections for establishing a selected capacitance value.

The connections of the wires 50-55 and the foil 38 to the terminal posts is made prior to placing the capacitive element 12 in the case 60, adding the insulating fluid 76, and sealing the cover 82 of cover assembly 80 to the case 60. The case 60 may be labeled with the capacitance values of the capacitance sections 20-25 adjacent the cover terminals, such as on the side of case 60 near the cover 82 or on the cover 82.

The capacitor 10 may be used to replace a failed capacitor of any one of over two hundred different capacitance values, including both single and dual applications. Therefore, a serviceman is able to replace virtually any failed capacitor he may encounter as he makes service calls on equipment of various manufacturers, models, ages and the like.

As noted above, the capacitor 10 is expected to be used widely in servicing air conditioning units. Air conditioning units typically have two capacitors; a capacitor for the compressor motor which may or may not be of relatively high capacitance value and a capacitor of relatively low capacitance value for a fan motor. The compressor motor capacitors typically have capacitances of from 20 to about 60 microfarads. The fan motor capacitors typically have capacitance values from about 2.5 to 12.5 microfarads, and sometimes as high as 15 microfarads, although values at the lower end of the range are most common.

Figure 11:
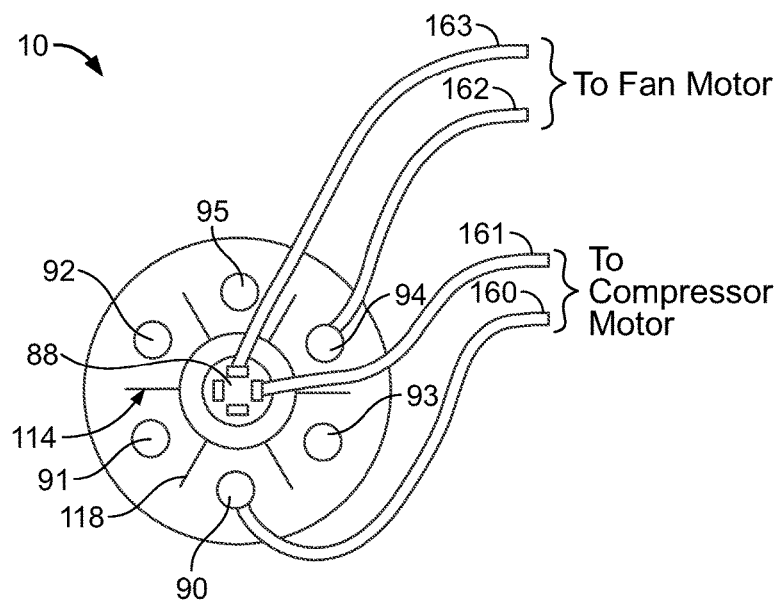
FIG. 11 is a top view of the capacitor of FIG. 1e, shown with selected capacitor sections connected to a fan motor and a compressor motor.
Figure 12:
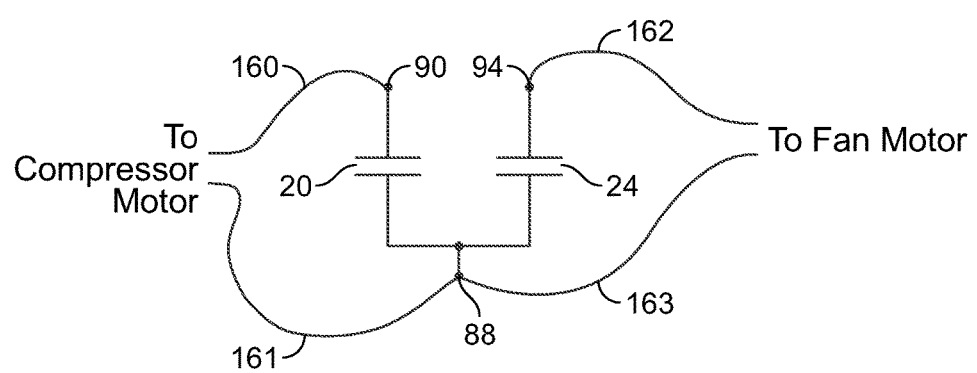
FIG. 12 is a schematic circuit diagram of the capacitor of FIG. 1e connected as shown in FIG. 11.

With reference to FIG. 11, capacitor 10 is connected to replace a compressor motor capacitor and a fan motor capacitor, where the compressor motor capacitor has a value of 25.0 microfarads and the fan motor capacitor has a value of 4.0 microfarads. The 25.0 microfarad replacement capacitance for the compressor motor is made by one of the compressor motor leads 160 being connected to one of the blades of the blue section cover terminal 90 of capacitance section 20, which has a capacitance value of 25.0 microfarads, and the other compressor motor lead 161 being connected to one of the blades 120 of common cathode cover terminal 88. The lead 162 from the fan motor is connected to the white section cover terminal 94 of capacitor section 24, and the second lead 163 from the fan motor is also connected to the common cathode cover terminal 88. As set forth above, the actual capacitance value of the capacitor section 24 that is connected to the section cover terminal 94 is 4.5 microfarads, and the instructions and/or labeling for the capacitor 10 indicate that the capacitor section 24 as represented at terminal 94 should be used for a 4.0 microfarad replacement. Preferred labeling for this purpose can be "5.0 (4.0) microfarads" or similar. The 4.5 microfarad capacitance value is within approximately 10% of the specified 4.0 microfarad value, and that is within acceptable tolerances for proper operation of the fan motor. Of course, the capacitor section 24 and terminal 94 may be connected to replace a 5.0 microfarad capacitance value as well, whereby the 4.5 microfarad actual capacitance value of capacitor section 24 gives added flexibility in replacing failed capacitors. Similarly, the 5.5 microfarad capacitor section 23 can be used for either 5.0 microfarad or 6.0 microfarad replacement, and the 2.8 microfarad section 25 can be used for a 3.0 microfarad replacement or for a 2.5 microfarad additive value. FIG. 12 schematically illustrates the connection of capacitor sections 20 and 24 to the compressor motor and fan motor shown in FIG. 11.

Figure 13:
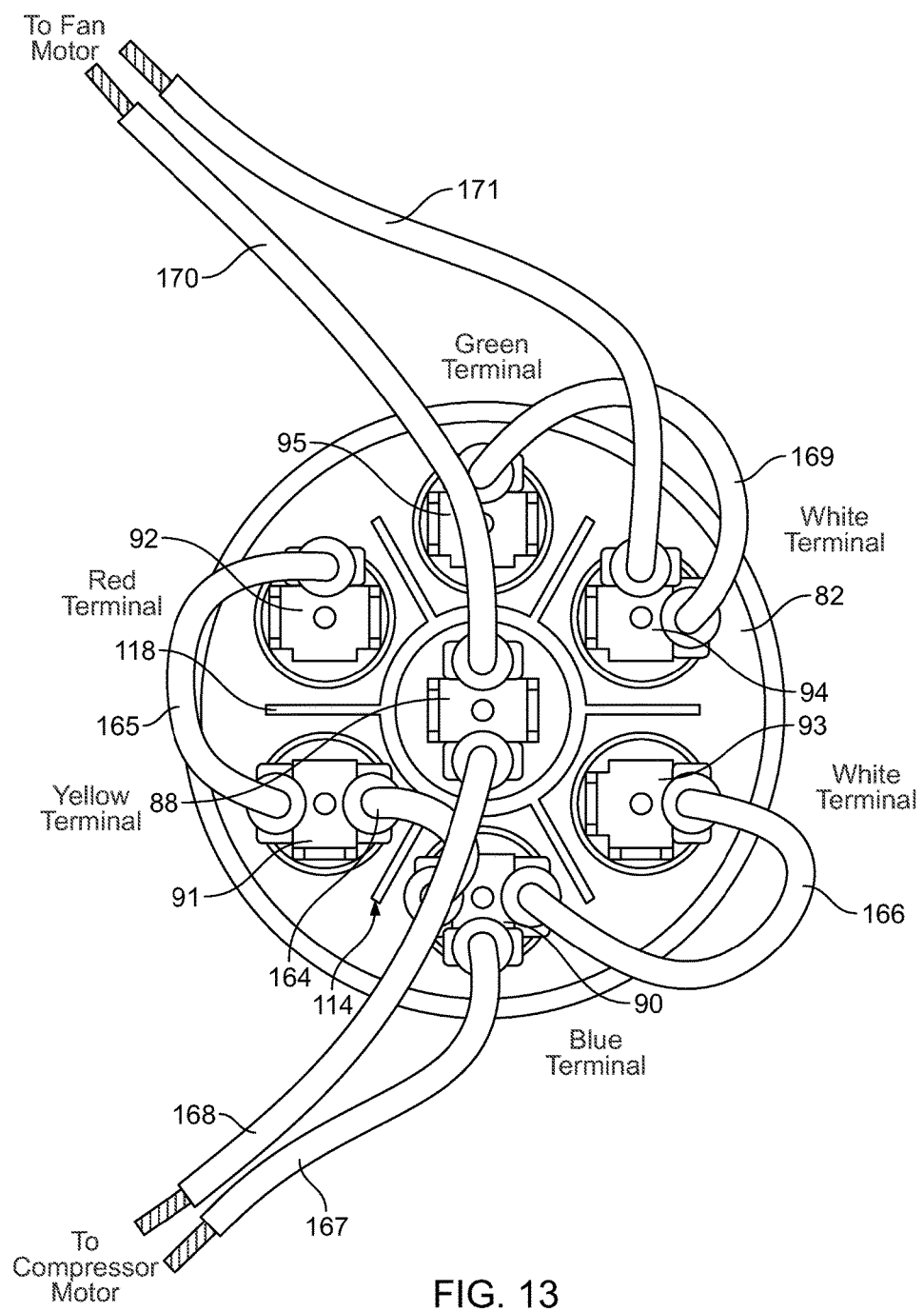
FIG. 13 is a top view of the capacitor of FIG. 1 with jumper wires connecting selected capacitor sections in parallel, and also shown connected in an electrical circuit to a fan motor and a compressor motor.

FIG. 13 illustrates another connection of the capacitor 10 for replacing a 60.0 microfarad compressor motor capacitor and a 7.5 microfarad fan motor capacitor. The formula for the total capacitance value for capacitors connected in parallel is additive namely:

$$C_{total}=C_1+C_2+C_3+\ldots$$

Therefore, with reference to FIG. 13, a 60.0 microfarad capacitance value for the compressor motor is achieved by connecting in parallel the section cover terminal 90 (capacitor section 20 at a value of 25.0 microfarads), section cover terminal 91 (capacitor section 21 at a value of 20.0 microfarads), section cover terminal 92 (capacitor section 22 at a value of 10.0 microfarads) and section cover terminal 93 (capacitor section 23 at a nominal value of 5.0 microfarads). The foregoing connections are made by means of jumpers 164, 165 and 166, which may be supplied with the capacitor 10. Lead 167 is connected from the section cover terminal 90 of the capacitor section 20, e.g., to the compressor motor, and lead 168 is connected from the common cathode cover terminal 88, e.g., to the compressor motor. This has the effect of connecting the specified capacitor sections 20, 21, 22 and 23 in parallel, giving a total of 60.0 microfarad capacitance; to wit: 25+20+10+5=60. It is preferred but not required to connect the lead from the compressor motor or the fan motor to the highest value capacitor section used in providing the total capacitance.

Figure 14:
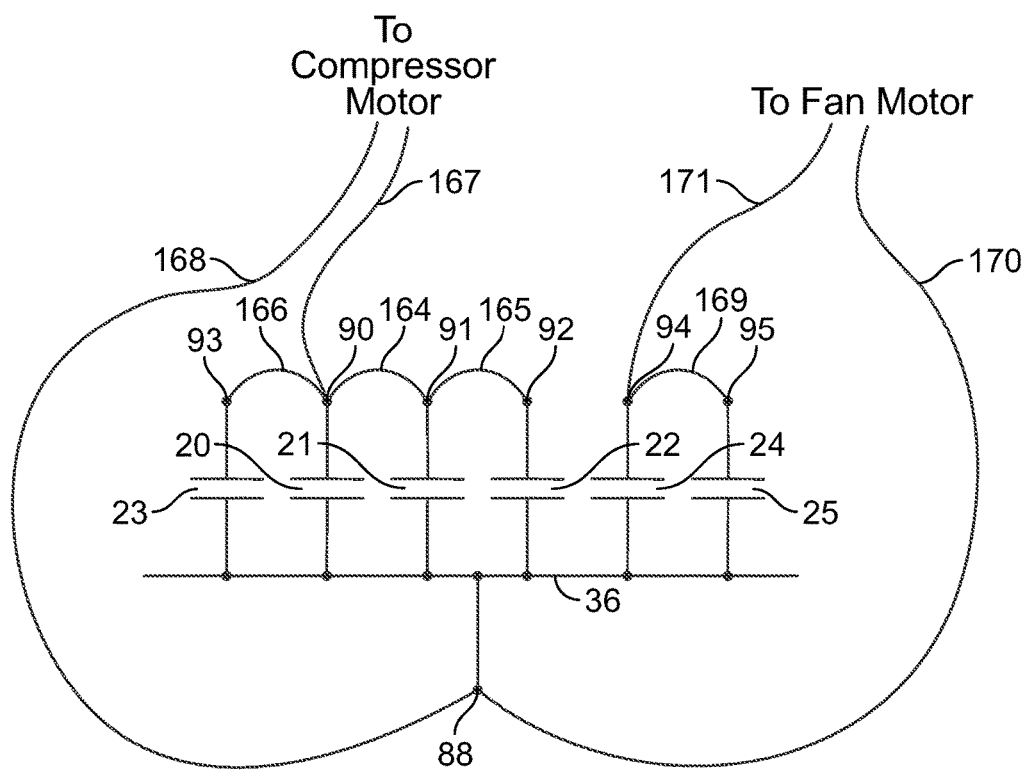
FIG. 14 is a schematic circuit diagram of the capacitor of FIG. 1e connected as shown in FIG. 13.

Similarly, a 7.5 microfarad capacitance is provided to the fan motor by connecting section cover terminal 94 of the 5.0 microfarad capacitor section 24 and the section cover terminal 95 of the nominal 2.5 microfarad capacitor section 25 in parallel via jumper 169. Leads 170 and 171 connect the fan motor to the common cathode cover terminal 88 and the section cover terminal 95 of the capacitor section 25. FIG. 14 diagrammatically illustrates the connection of the capacitor 10 shown in FIG. 13.

It will be appreciated that various other jumper connections between section cover terminals can be utilized to connect selected capacitor sections in parallel, in order to provide a wide variety of capacitance replacement values.

The capacitor sections can also be connected in series to utilize capacitor 10 as a single value replacement capacitor. This has the added advantage of increasing the voltage rating of the capacitor 10 in a series application, i.e. the capacitor 10 can safely operate at higher voltages when its sections are connected in series. As a practical matter, the operating voltage will not be increased as it is established by the existing equipment and circuit, and the increased voltage rating derived from a series connection will increase the life of the capacitor 10 because it will be operating well below its maximum rating.

Figure 15:
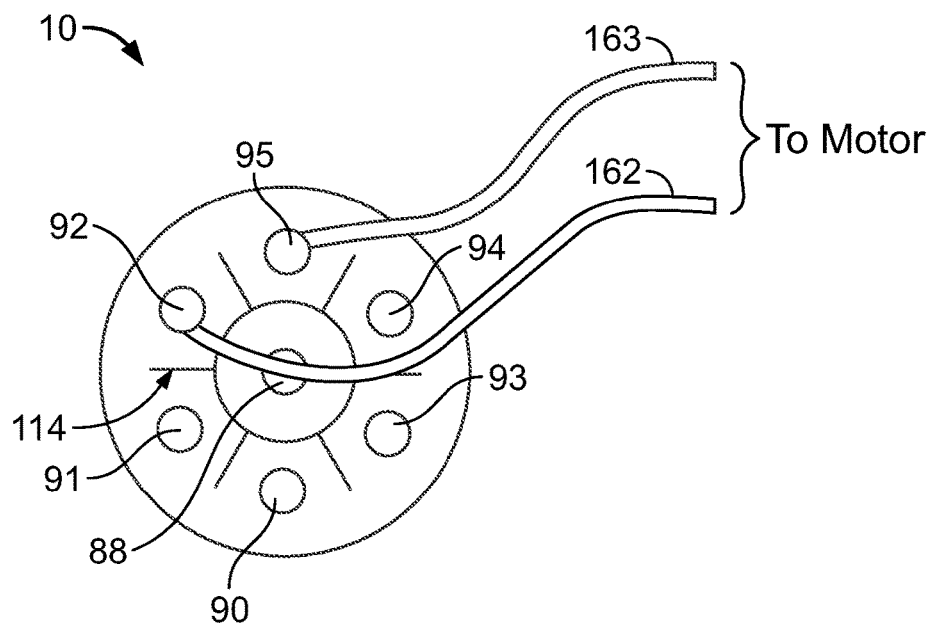
FIG. 15 is a top view of the capacitor of FIG. 1 connecting selected capacitor sections in series, and also shown connected in an electrical circuit to a motor.
Figure 16:
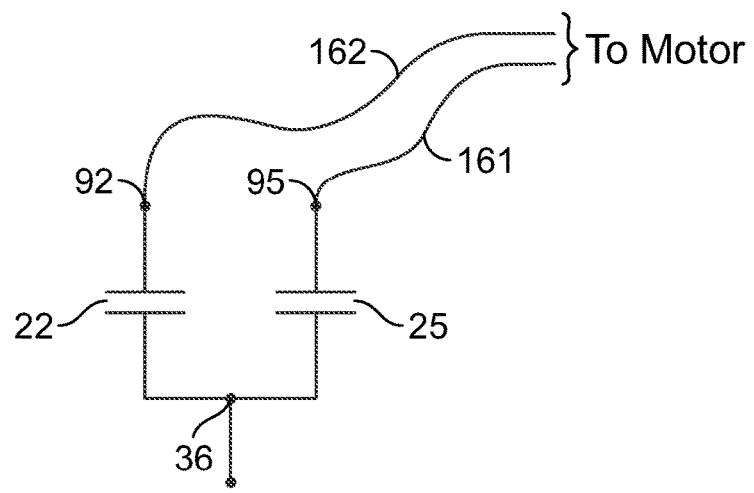
FIG. 16 is a schematic circuit diagram of the capacitor of FIG. 1e as connected shown in FIG. 15.

With reference to FIG. 15, the capacitor 10 is shown with capacitor section 22 (terminal 92) having a value of 10.0 microfarads connected in series with capacitor section 25 (terminal 95) having a nominal value of 2.5 microfarads to provide a replacement capacitance value of 2.0 microfarads. Leads 162 and 163 make the connections from the respective section cover terminals 92 and 95 to the motor, and the element common cathode terminal 36 connects the capacitor sections 22 and 25 of capacitive element 12. With reference to FIG. 16, the connection of capacitor 10 shown in FIG. 15 is illustrated diagrammatically. In both FIGS. 15 and 16, it will be seen that the cover common cathode terminal 88 is not used in making series connections.

The formula for capacitance of capacitors connected in series is $$\frac{1}{C_{total}} = \frac{1}{C_1} + \frac{1}{C_2} + \frac{1}{C_3} + \ldots$$

Therefore, the total capacitance of the capacitor sections 22 and 25 connected as shown in FIGS. 15 and 16 is 2.0 microfarads. The capacitance of each of the capacitor sections 20-25 is rated at 440 volts. However, when two or more capacitor sections 20-25 are connected in series, the applied voltage section is divided between the capacitor sections in inverse proportion to their value. Thus, in the series connection of FIGS. 15 and 16, the nominal 2.5 microfarad section sees about 80% of the applied voltage and the 10.0 microfarad section sees about 20% of the applied voltage. The net effect is that the capacitor 10 provides the 2.0 microfarad replacement value at a higher rating, due to the series connection. In this configuration, the capacitor 10 is lightly stressed and is apt to have an extremely long life.

Figure 17:
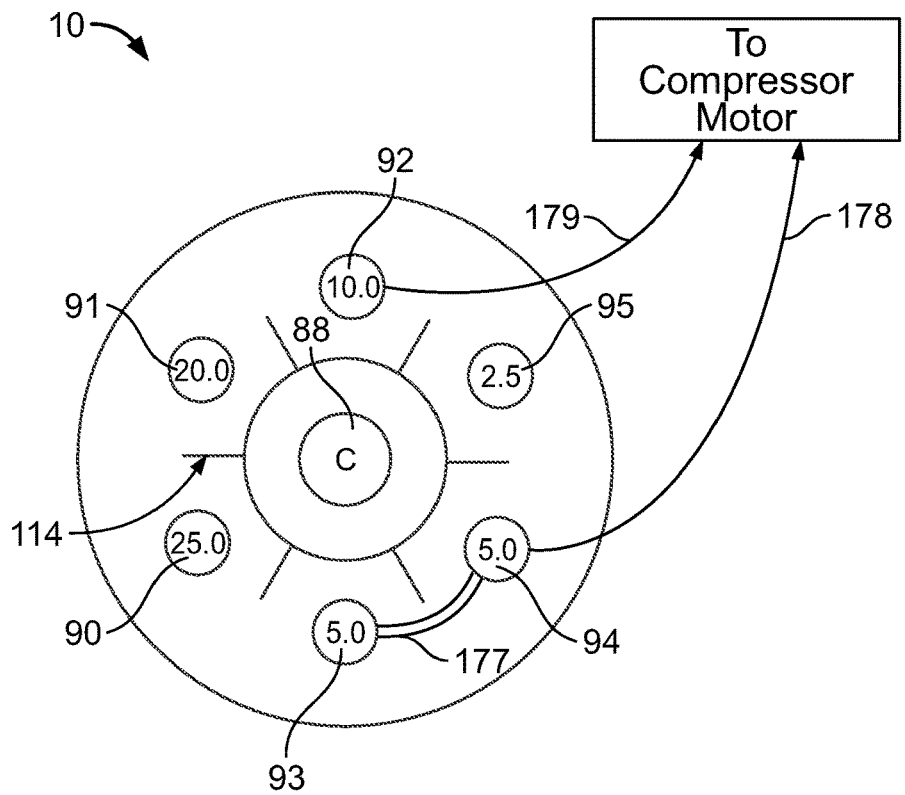
FIG. 17 is a top view of the capacitor of FIG. 1 with a jumper wire connecting selected capacitor sections in series, and also shown connected in an electrical circuit to a compressor motor.

With reference to FIG. 17, the capacitor sections of the capacitor 10 are shown connected in a combination of parallel and series connections to provide additional capacitive values at high voltage ratings, in this case 5.0 microfarads. The two capacitor sections 23 and 24 each having a nominal value of 5.0 microfarads are connected in parallel by jumper 177 between their respective cover section terminals 93 and 94. The leads 178 and 179 from a compressor motor are connected to the section cover terminal 92 of capacitor section 22 having a value of 10.0 microfarads, and the other lead is connected to cover section terminal 94 of capacitor section 24. Thus, a capacitance value of 5.0 microfarads is provided according to the following formula $$\frac{1}{C_{total}} = \frac{1}{C_1} + \frac{1}{C_2}$$

Figure 18:
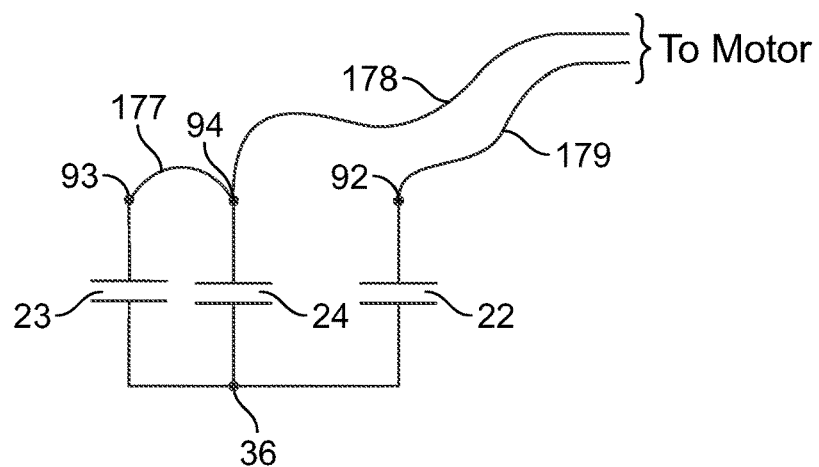
FIG. 18 is a schematic circuit diagram of the capacitor of FIG. 1e connected as shown in FIG. 17.

$C_1$ is a parallel connection having the value C+C, in this case 5.0+5.0 for a $C_1$ of 10.0 microfarads. With that substitution, the total value is $C_{total}$=5.0 microfarads. The connection of capacitor 10 illustrated in FIG. 17 is shown diagrammatically in FIG. 18.

FIG. 19 is a chart showing single capacitance values that can be provided by the capacitor 10 connected in parallel. The values are derived by connecting individual capacitor sections into a circuit, or by parallel connections of capacitor sections. The chart should be interpreted remembering that the 2.8 microfarad capacitor section can be used as a 2.5 or 3.0 microfarad replacement, and that the two 5.0 microfarad values are actually 4.5 and 5.5 microfarad capacitor sections, also with possibilities for more replacements.

FIGS. 20-23 are charts showing applications of capacitor 10 in replacing both a fan motor capacitor and a compressor motor capacitor. This is an important capability, because many air conditioning systems are equipped with dual value capacitors and when one of the values fails, another dual value capacitor must be substituted into the mounting space bracket.

The chart of FIG. 20 shows dual value capacitances that can be provided by capacitor 10 wherein the nominal 2.5 microfarad capacitor section 25 is used for one of the dual values, usually the fan motor. Fan motors are generally not rigid in their requirements for an exact capacitance value, wherein the capacitor section 25 may also be used for fan motors specifying a 3.0 microfarad capacitor. The remaining capacitor sections 20-24 are available for connection individually or in parallel to the compressor motor, providing capacitance values from 5.0 to 65.0 microfarads in 5.0 microfarad increments.

The chart of FIG. 21 also shows dual value capacitances that can be provided by capacitor 10. In the chart of FIG. 21, one of the dual values is 5.0 microfarads that can be provided by either capacitor section 23 having an actual capacitance value of 5.5 microfarads or by capacitor section 24 having an actual capacitance of 4.5 microfarads. As discussed above, the capacitor section 24 can also be used for a 4.0 microfarad replacement value, and capacitor section 23 could be used for a 6.0 microfarad replacement value. Thus, chart 21 represents more dual replacement values than are specifically listed. The other capacitor section may be used in various parallel connections to achieve the second of the dual capacitance values.

The chart of FIG. 22 illustrates yet additional dual value capacitances that can be provided by capacitor 10. Capacitor section 25 (nominal 2.5 microfarads) is connected in parallel with one of capacitor section 23 (5.5 microfarads) or capacitor section 24 (4.5 microfarads) to provide a 7.5 microfarad capacitance value as one of the dual value capacitances. The remaining capacitor sections are used individually or in parallel to provide the second of the dual value capacitances.

The chart of FIG. 23 illustrates yet additional dual value capacitances that can be provided by capacitor 10, where capacitor section 22 (10 microfarads) is dedicated to provide one of the dual values. The remaining capacitor sections are used individually or in parallel for the other of the dual values.

It will be appreciated that any one or group of capacitor sections may be used for one of a dual value, with a selected one or group of the remaining capacitor sections connected to provide another capacitance value. It will also be appreciated that the capacitor 10 could provide six individual capacitance values corresponding to the capacitor sections, or three, four or five capacitance values in selected individual and parallel connections. Additional single values can be derived from series connections.

The six capacitor sections 20-25 can provide hundreds of replacement values, including single and dual values. It will further be appreciated that if fewer replacement values are required, the capacitor 10 can be made with fewer than six capacitor sections, and that if more replacement values were desired, the capacitor 10 could be made with more than six capacitor sections While specific values for the capacitance of the capacitor sections are given above, it is to be understood that different values may be provided. For example, some air conditioning systems include so-called "motor-start" capacitors with typical capacitances in the range of 30 microfarads to 300 microfarads. Such capacitors are typically used during start-up periods. In some embodiments, capacitor 10 is a replacement capacitor for a "motor-run" capacitor. The capacitance values for capacitance sections 20-25 are about 22.5 microfarads, about 33.0 microfarads, about 40.0 microfarads, about 45.0 microfarads, about 70.0 microfarads, and about 90 microfarads, respectively. The color of white terminal 94 is changed to purple to indicate that corresponds to a capacitor section with a different capacitance value than that of terminal 93. The chart of FIG. 24 illustrates a number of single vale capacitances that can be provided by capacitor 10. For example, as shown in column g, the 70 microfarad, 45 microfarad, and 22.5 microfarad capacitor sections can be connected in parallel as described above to provide a single capacitance vale of 107.5 microfarads. In other embodiments, capacitance values for capacitance sections 20-25 are about 20 microfarads, about 30 microfarads, about 55 microfarads, about 67 microfarads, about 70.0 microfarads, and about 83 microfarads, respectively.

In various embodiments, capacitor 10 can provide single, dual, or multiple capacitance values over a variety of ranges. In some embodiments, capacitor 10 may provide capacitance values of, for example, up to 300 microfarads or more or about 400 microfarads or more. Capacitor 10 can also include capacitor sections with a variety of voltage ratings, thereby providing a suitable replacement for a range of capacitors with different operating voltages.

There are occasional failures of capacitive elements. If the capacitive element fails, it may do so in a sudden and violent manner, producing heat and outgassing such that high internal pressures are developed within the housing. Pressure responsive interrupter systems have been designed to break the connection between the capacitive element and the cover terminals in response to the high internal pressure, thereby removing the capacitive element from a circuit and stopping the high heat and overpressure condition within the housing before the housing ruptures.

Figure 25:
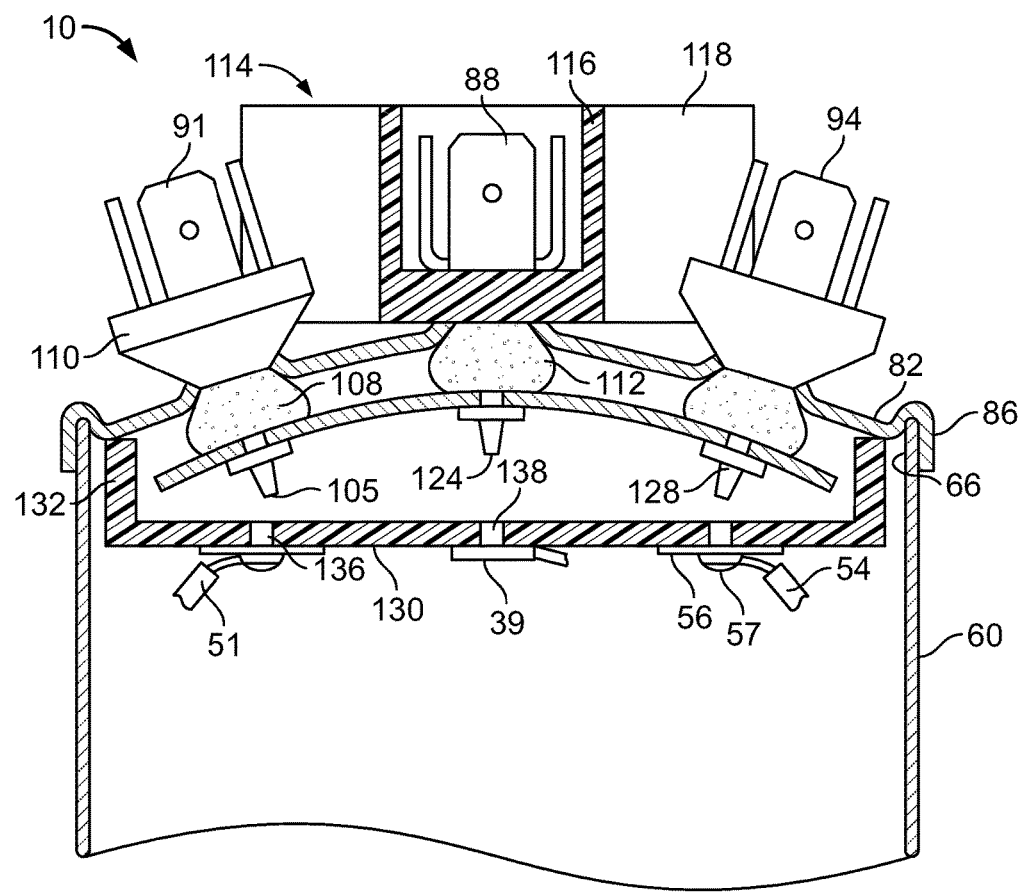
FIG. 25 is a sectional view of the capacitor of FIG. 1e, taken generally along the lines 24-24 of FIG. 2, but showing the capacitor after failure of the capacitive element.

The pressure interrupter cover assembly 80 provides such protection for the capacitor 10 and its capacitive element 12. With reference to FIG. 25, the capacitor 10 is shown after failure. Outgassing has caused the circular cover 82 to deform upwardly into a generally domed shape. When the cover 82 deforms in the manner shown, the terminal posts are also displaced upwardly from the disconnect plate 130, and the weld connection of the distal end 124 of common cathode cover terminal post 122 to the distal end 39 foil lead 38 from the common cathode element 36 of the capacitive element 12 is broken, and the welds between the foil tabs 56 and the terminal posts 104 of the section cover terminals 90-95 are also broken, the separation at section cover terminals 91 and 94 being shown.

Although the preferred pressure interrupter cover assembly includes the foil lead 38 and foil tabs 56, frangibly connected to the distal ends of the terminal posts, the frangible connections both known in the art and to be developed may be used. As an example, the terminal posts themselves may be frangible.

It should be noted that although it is desirable that the connections of the capacitive element and all cover terminals break, it is not necessary that they all do so in order to disconnect the capacitive element 12 from a circuit. For all instances in which the capacitor 10 is used with its capacitor sections connected individually or in parallel, only the terminal post 122 of common cathode cover terminal 88 must be disconnected in order to remove the capacitive element 12 from the circuit. Locating the cover common terminal 88 in the center of the cover 82, where the deformation of the cover 82 is the greatest, ensures that the common cover terminal connection is broken both first and with certainty in the event of a failure of the capacitive element 12.

If the capacitor sections of the capacitor 10 are utilized in a series connection, it is necessary that only one of the terminal posts used in the series connection be disconnected from its foil tab at the disconnect plate 130 to remove the capacitive element from an electrical circuit. In this regard, it should be noted that the outgassing condition will persist until the pressure interrupter cover assembly 80 deforms sufficiently to cause disconnection from the circuit, and it is believed that an incremental amount of outgassing may occur as required to cause sufficient deformation and breakage of the circuit connection at the terminal post of one of the section cover terminal. However, in some applications of the capacitor 10, the common cover terminal 88 may be used and the central location of the common cover terminal 88 may cause fast and certain disconnect upon any failure of the capacitive element.

Two other aspects of the design are pertinent to the performance of the pressure interrupter system. First, with respect to series connections only, the common cover terminal 88 may be twisted to pre-break the connection of the terminal post 122 with the foil strip 38, thus eliminating the requirement of any force to break that connection in the event of a failure of the capacitive element 12. The force that would otherwise be needed to break the connection of common terminal post 122 is then applied to the terminal posts of the section cover terminals, whereby the section cover terminals are more readily disconnected. This makes the pressure interrupter cover assembly 80 highly responsive in a series connection configuration.

Second, the structural aspects of welding foil tabs to the distal ends of the terminal posts corresponding to the various capacitor sections and thereafter soldering the connecting wires onto the foil tabs 56 is also believed to make the pressure interrupter cover assembly 80 more responsive to failure of the capacitive element 12. In particular, the solder and wire greatly enhance the rigidity of the foil tabs 56 wherein upon deformation of the cover 82, the terminal posts break cleanly from the foil tabs 56 instead of pulling the foil tabs partially through the disconnect plate before separating.

A number of embodiments of the invention have been described. Nevertheless, it will be understood that various modifications may be made without departing from the spirit and scope of the invention.

For example, although the above described embodiments employ electrolytic capacitor sections of the foil type, other types of capacitor sections may be used including tantalum electrolytic, electrolytic double-layer, or aerogel.

In some embodiments, one or more capacitor sections may be a non electrolytic capacitor section. For example, capacitor 10 could include capacitor sections which are of the ceramic type, silver mica type, plastic film type, tantalum type, and/or polyester film type. In some embodiments, the capacitor sections may include a combination of capacitor types.

Various types of electrical connections may be used. For example, the foil strip used to connect the common cathode terminal of capacitor element 12 to the common cathode cover terminal 88 may be replaced by an insulated wire. Various electrical contacts may be provided by any method including, for example, crimping, soldering and/or welding.

What is claimed is:

1. An apparatus suitable for use in an air-conditioning system and configured to provide a plurality of selectable capacitance values, comprising:
   a plurality of electrolytic capacitive devices housed in a case, each of the electrolytic capacitive devices having
      a first capacitor terminal and a second capacitor terminal, three of the electrolytic capacitive devices having a combined capacitance value of about 120.0 microfarads;
   a pressure interrupter cover assembly comprising:
      a deformable cover mountable to the case,
      a set of capacitor cover terminals, each capacitor cover terminal having at least one contact extending from the deformable cover, wherein the deformable cover is configured to displace at least one of the capacitor cover terminals based upon an operative failure of at least one of the electrolytic capacitive devices, a common cover terminal having at least one contact extending from the deformable cover, and a set of insulation structures, wherein each insulation structure is configured to provide insulation for at least one of the capacitor cover terminals; and a conductor configured to electrically connect the second capacitor terminal of at least one of the electrolytic capacitive devices to the common cover terminal, wherein the first capacitor terminal of the at least one of the electrolytic capacitive devices is electrically connected to one of the capacitor cover terminals.

2. The apparatus of claim 1, each of the plurality of electrolytic capacitive devices being provided by a section of a wound capacitive element.

3. The apparatus of claim 1, each of the plurality of electrolytic capacitive devices being separately wound.

4. The apparatus of claim 1, wherein selective connections of the capacitor cover terminals provide at least two hundred operable capacitance values.

5. The apparatus of claim 1, the apparatus being configured for use by a compressor motor of the air-conditioning system and for use by a fan motor of the air-conditioning system.

6. The apparatus of claim 1, wherein the apparatus comprises six electrolytic capacitive devices.

7. The apparatus of claim 6, wherein the combined capacitance value of the six electrolytic capacitive devices is greater than about 200.0 microfarads.

8. The apparatus of claim 6, wherein the combined capacitance value of the six electrolytic capacitive devices is greater than about 300.0 microfarads.

9. The apparatus of claim 1, wherein at least one of the insulation structures is cup shaped.

10. The apparatus of claim 1, wherein four of the electrolytic capacitive devices have a combined capacitance value greater than about 245.0 microfarads and two of the electrolytic capacitive devices have a combined capacitance value greater than about 55.5 microfarads.

11. The apparatus of claim 1, wherein the common cover terminal includes at least two blades.

12. The apparatus of claim 1, wherein each capacitor cover terminal includes less than four blades.

13. The apparatus of claim 1, wherein at least one of the insulation structures includes an insulator cup.

14. The apparatus of claim 1, each of the plurality of electrolytic capacitive devices being sections of a wound capacitive element.

15. The apparatus of claim 1, wherein the case is configured to receive a fill fluid.

16. The apparatus of claim 1, wherein the case and the deformable cover are metallic.

17. The apparatus of claim 1, wherein at least two of the insulation structures are colored.

18. The apparatus of claim 1, wherein at least five of the insulation structures are differently colored.

19. The apparatus of claim 1, wherein four of the electrolytic capacitive devices have a combined capacitance value greater than about 245.0 microfarads and the remainder of the electrolytic capacitive devices have a combined capacitance value greater than about 55.5 microfarads.

* * * * *